(12) United States Patent
Abe

(10) Patent No.: US 7,551,371 B2
(45) Date of Patent: Jun. 23, 2009

(54) OPTICAL PICKUP APPARATUS AND OPTICAL DISC APPARATUS

(75) Inventor: Tsuguhiro Abe, Chiba (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 11/601,888

(22) Filed: Nov. 20, 2006

(65) Prior Publication Data

US 2007/0115791 A1 May 24, 2007

(30) Foreign Application Priority Data

Nov. 22, 2005 (JP) ............................. 2005-337137

(51) Int. Cl.
*G02B 13/18* (2006.01)
*G11B 7/00* (2006.01)

(52) U.S. Cl. ............. 359/719; 369/112.24; 369/112.25; 369/112.26

(58) Field of Classification Search ................. 359/708, 359/716–719, 721; 369/112.23, 112.24, 369/112.25, 112.26
See application file for complete search history.

(56) References Cited

U.S. PATENT DOCUMENTS

2004/0150892 A1* 8/2004 Takeuchi et al. ............ 359/719

FOREIGN PATENT DOCUMENTS

JP 2004 247034 9/2004

* cited by examiner

*Primary Examiner*—William C Choi
*Assistant Examiner*—Jack Dinh
(74) *Attorney, Agent, or Firm*—Frommer Lawrence & Haug LLP; William S. Frommer

(57) ABSTRACT

There is provided an optical pickup apparatus which includes a light source that generates light irradiating an optical recording medium; and an objective lens that collects the light irradiated from the light source on a recording surface of the recording medium, which further includes a coupling lens arranged on an optical path between the light source and the objective lens. In the optical pickup apparatus, a surface shape of the coupling lens is formed so that a preset spherical aberration amount is generated in the light irradiated from the light source at a position settled corresponding to a shift amount of the objective lens and where the light irradiated from the light source passes through the coupling lens, when the objective lens shifts.

15 Claims, 23 Drawing Sheets

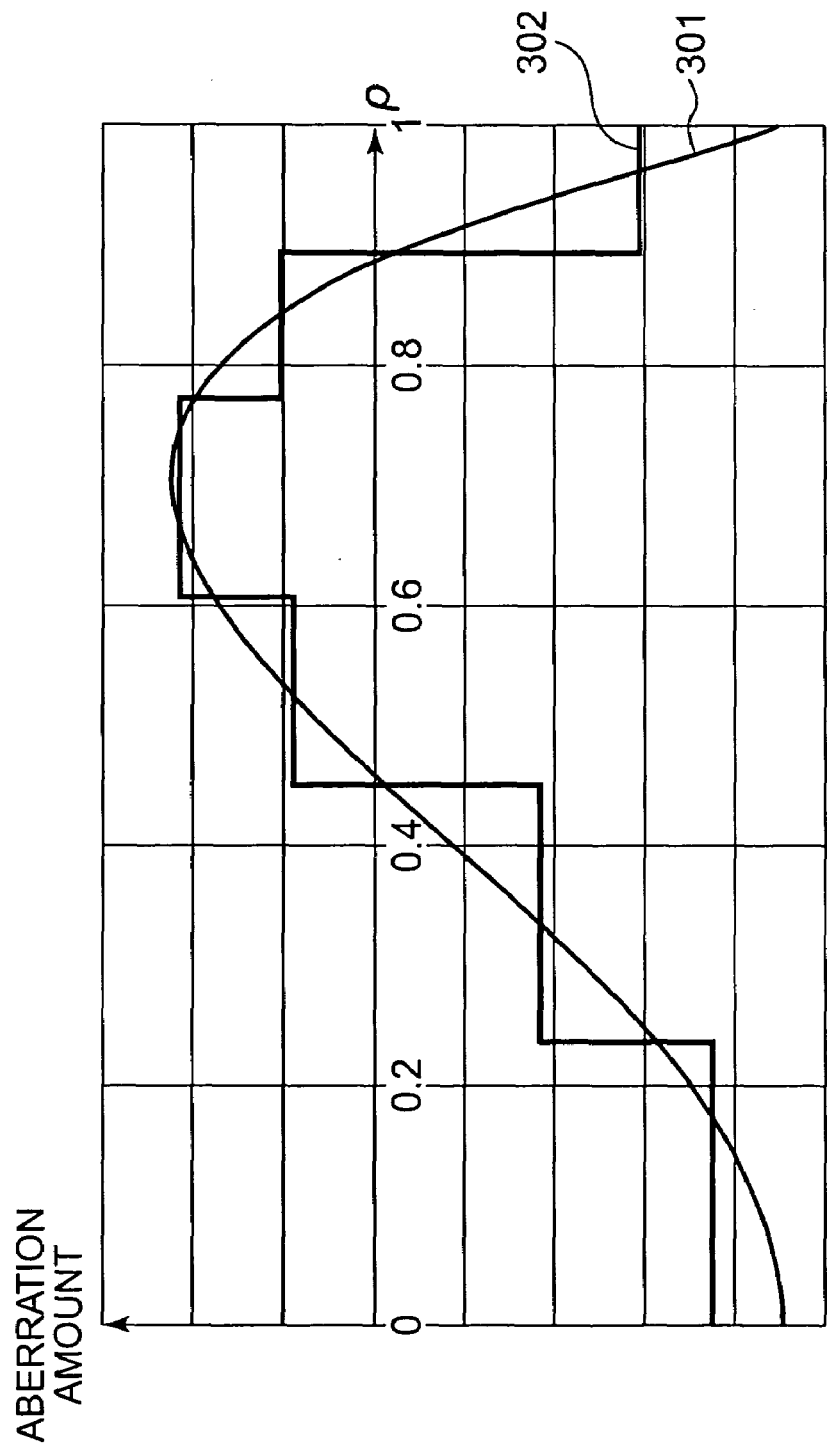

| | value coeff. |
|---|---|
| Sa | 0.10 |
| Sk | 0.03 |
| γ | 0.70 |
| δ | 0.25 |

FIG. 20

|  | t (mm) | n |
|---|---|---|
| s0 | 2 | — |
| s1 | 0.57 | 1.52 |
| s2 | 1.91 | — |
| s3 | 2.86 | 1.54 |
| s4 | 6.68 | — |
| s5 | 1.86 | 1.54 |
| s6 | 1.186 | — |
| s7 | 0.6 | 1.55 |
| s8 | — | — |

FIG. 21

|  | COUPLING LENS | | OBJECTIVE LENS | |
|---|---|---|---|---|
|  | S3 | S4 | S5 | S6 |
| R | -0.635 | -1.732 | 1.574 | -3.585 |
| K | -1.291 | -0.288 | -0.891 | -6.915 |
| A | -1.620E+00 | 3.607E-02 | 7.121E-02 | 3.192E-01 |
| B | -1.553E+02 | -2.092E-01 | 3.010E-02 | -5.705E-01 |
| C | 2.355E+03 | 4.003E-01 | 5.244E-02 | 5.131E-01 |
| D | -1.511E+04 | -2.612E-01 | -8.296E-02 | -2.015E-01 |

FIG. 23

|   | COUPLING LENS | | OBJECTIVE LENS | |
|---|---|---|---|---|
|   | S3 | S4 | S5 | S6 |
| R | -0.635 | -1.731 | 1.574 | -3.587 |
| K | -1.454 | -0.302 | -0.856 | -8.151 |
| A | -1.373E+00 | 4.557E-02 | 6.252E-02 | 2.966E-01 |
| B | -1.785E+02 | -2.575E-01 | 2.543E-02 | -5.881E-01 |
| C | 2.757E+03 | 4.936E-01 | 4.564E-02 | 5.602E-01 |
| D | -1.750E+04 | -6.398E-01 | -9.638E-02 | -2.316E-01 |

OPTICAL PICKUP APPARATUS AND OPTICAL DISC APPARATUS

CROSS REFERENCES TO RELATED APPLICATIONS

The present document contains subject matter related to Japanese Patent Application JP 2005-337137 filed in the Japanese Patent Office on Nov. 22, 2005, the entire contents of which being incorporated herein by reference.

BACKGROUND OF THE INVENTION

1. Field of the Invention

The present invention relates to an optical pickup apparatus and an optical disc apparatus, and particularly to an optical pickup apparatus and an optical disc apparatus allowing a small-sized apparatus to perform stable aberration correction.

2. Description of Related Art

In recent years, in an optical disc apparatus typified by a Digital Versatile Disc (DVD) recorder/player and the like, further downsizing and reduction in thickness have been desired for adaptation to mobile equipment such as a laptop personal computer and a mobile DVD player, and demand for space saving, and so on. Also, in a mobile game machine and the like, an optical disc apparatus capable of reproducing a high-density disc such as a Universal Media Disc (UMD), and which can be manufactured so as to have a small size and a small thickness has been needed. Furthermore, in an apparatus using a high-density next-generation optical recording medium typified by a Blu-ray disc (trademark), downsizing and reduction in thickness are unavoidable in order to realize higher-performance, improvement in design and the like.

In order to realize such a smaller and thinner optical disc apparatus, downsizing and reduction in thickness of an optical pickup employed in the optical disc apparatus and its optical system are required.

In the past, in an optical disc apparatus using a recording medium whose NA is not so high (that is, not requiring a high storage capacity), such as a Compact Disc (CD) and a Mini Disc (MD), an optical pickup employing a so-called infinite optical system as shown in FIG. 1 is changed to a pickup employing a so-called finite optical system as shown in FIG. 2 to achieve downsizing, and reduction in thickness of the apparatus (for example, refer to Japanese Patent Application Publication (KOKAI) No. 2005-247034).

In the infinite optical system, a light irradiated from a light source 11 is changed to a parallel light through a collimator lens 12, and passes through an objective lens 13 to thereby be collected on a recording surface of a recording medium 14.

The infinite optical system is configured such that no aberration occurs with respect to shift of the objective lens 13 corresponding to tracking servo or focusing servo. However, in the infinite optical system, a distance from the light source 11 to the collimator lens 12 needs to be almost the same as a focal distance of the collimator lens 12, and an outer diameter dimension and a light flux diameter of the collimator lens 12 need to be so large that a parallel light flux thick enough to satisfy a movement range of the objective lens 13 can be obtained, which limit downsizing and reduction in thickness of the entire optical system.

In contrast, in the finite optical system, the light irradiated from the light source 11 arranged at a finite distance from the objective lens 13 is directly received by the objective lens 13, or is received by the objective lens 13 through a coupling lens 15 to be collected on the recording surface of the recording medium 14.

In the finite optical system, since no lens other than the objective lens 13 may be used, or the coupling lens 15 having a relatively small lens outer diameter can be used, and further, a distance between an object and an image can be short, downsizing and reduction in thickness of the entire optical system can be achieved. While aberration with respect to the shift of the objective lens 13 for tracking servo or focusing servo occurs, in a CD or MD of a low NA, the aberration amount caused by the shift of the objective lens is not so large that the system margin is collapsed, and thus, downsizing and reduction in thickness by the finite optical system have been allowed to be realized.

SUMMARY OF THE INVENTION

However, in the optical disc apparatus using a DVD or UMD of a large NA as a recording medium, there is a possibility that employing the finite optical system for the downsizing and reduction in thickness of the apparatus deteriorates the aberration amount caused by the shift of the objective lens to such an extent that the system margin is collapsed, which makes practical application difficult. Furthermore, if ever, there is a possibility that practical application causes deterioration in yield, increase in market defect and the like.

The present invention has been achieved in light of the above-described situation, and is to realize stable correction of aberration with a small-sized apparatus.

A first embodiment of the present invention is an optical pickup apparatus which includes a light source that generates light irradiating an optical recording medium, and an objective lens that collects the light irradiated from the light source on a recording surface of the recording medium. The optical pickup apparatus further includes a coupling lens arranged on an optical path between the light source and the objective lens. In the apparatus, a surface shape of the coupling lens is formed so that a preset spherical aberration amount is generated in the light irradiated from the light source at a position settled corresponding to a shift amount of the objective lens when the objective lens shifts, the position being where the light irradiated from the light source passes through the coupling lens.

A preset fourth-order or sixth-order spherical aberration amount can be added to the light passing through the coupling lens.

The coupling lens can have a surface shape which adds spherical aberration to the light passing through the coupling lens, the spherical aberration satisfying the formula:

$$|W_{as} - 12 S_a \gamma^4 \delta^2| < |W_{as}| \tag{21}$$

where, in an entire effective diameter region of the coupling lens, an aberration coefficient of Zernike fourth-order spherical aberration is $S_a$, a ratio B/A of a light flux diameter B to an entire effective diameter A of the coupling lens is $\gamma$, a ratio 2s/B of a light flux movement amount s at the time of objective lens shift to a light flux radius B/2 is $\delta$, and a Zernike astigmatism coefficient of off-axis astigmatism caused in the objective lens is $W_{as}$.

The coupling lens can have a surface shape which adds spherical aberration to the light passing through the coupling lens, the spherical aberration satisfying the formulae:

$$|W_{as} - [12 S_a \gamma^4 \delta^2 + S_k (210 \gamma^6 \delta^2 - 60 \gamma^4 \delta^2)]| < |W_{as}| \tag{22}$$

and $$|-8 S_a \gamma^4 \delta + S_k (-120 \gamma^6 \delta^3 - 24 \gamma^6 \delta + 40 \gamma^4 \delta)| < |-8 S_a \gamma^4 \delta| \tag{23}$$

where, in an entire effective diameter region of the coupling lens, an aberration coefficient of Zernike fourth-order spherical aberration is $S_a$, an aberration coefficient of Zernike sixth-order spherical aberration is $S_k$, a ratio B/A of a light flux diameter B to an entire effective diameter A of the coupling lens is $\gamma$, a ratio 2s/B of a light flux movement amount s at the time of objective lens shift to a light flux radius B/2 is $\delta$, and a Zernike astigmatism coefficient of field-of-view astigmatism caused in the objective lens is $W_{as}$.

The objective lens can have a surface shape which adds off-axis coma aberration to the light passing through the objective lens, the off-axis coma aberration satisfying the formula:

$$|W_{coma}-[-8S_a\gamma^4\delta]|<|-8S_a\gamma^4\delta| \quad (24),$$

where a Zernike coma aberration coefficient of field-of-view coma aberration of the light passing through the objective lens is $W_{coma}$, and in an entire effective diameter region of the coupling lens, an aberration coefficient of Zernike fourth-order spherical aberration is $S_a$, a ratio B/A of a light flux diameter B to an entire effective diameter A of the coupling lens is $\gamma$, and a ratio 2s/B of a light flux movement amount s at the time of objective lens shift to a light flux radius B/2 is $\delta$.

The objective lens can have a surface shape which adds spherical aberration to the light passing through the objective lens, the spherical aberration satisfying the formulae:

$$|W_{sa}-S|<|S| \quad (25)$$

$$S=S_a\gamma^4+S_k(-30\gamma^6\delta^2+5\gamma^6-5\gamma^4) \quad (26),$$

where a Zernike spherical aberration coefficient of the spherical aberration of the objective lens is $W_{sa}$, and in an entire effective diameter region of the coupling lens, an aberration coefficient of Zernike fourth-order spherical aberration is $S_a$, an aberration coefficient of Zernike sixth-order spherical aberration is $S_k$, a ratio B/A of a light flux diameter B to an entire effective diameter A of the coupling lens is $\gamma$, and a ratio 2s/B of a light flux movement amount s at the time of objective lens shift to a light flux radius B/2 is $\delta$.

In the first embodiment of the present invention, the coupling lens is arranged on the optical path between the light source and the objective lens, and the surface shape of the coupling lens is formed so that the preset spherical aberration amount is generated in the light irradiated from the light source at the position settled corresponding to the shift amount of the objective lens when the objective lens shifts, the position being where the light irradiated from the light source passes through the coupling lens.

A second embodiment of the present invention is an optical pickup apparatus which includes a light source that generates light irradiating an optical recording medium, an objective lens that collects the light irradiated from the light source on a recording surface of the recording medium, and a coupling lens arranged on an optical path between the light source and the objective lens. The optical pickup apparatus further includes an optical element arranged on the optical path between the coupling lens and the objective lens. In the apparatus, a surface shape of the optical element is formed so that a preset spherical aberration amount is generated in the light irradiated from the light source at a position settled corresponding to a shift amount of the objective lens when the objective lens shifts, the position being where the light irradiated from the light source passes through the optical element.

A preset fourth-order or sixth-order spherical aberration amount can be added to the light passing through the optical element.

The optical element can be constructed integrally with another optical element arranged in an optical disc apparatus in advance for correcting the spherical aberration caused by fluctuations in thickness of an optical disc or fluctuations in environmental temperature.

The optical element can be made of a liquid crystal element.

The optical element can have a surface shape which adds spherical aberration to the light passing through the optical element, the spherical aberration satisfying the formula:

$$|W_{as}-12S_a\gamma^4\delta^2|<|W_{as}| \quad (21),$$

where, in an entire effective diameter region of the optical element, an aberration coefficient of Zernike fourth-order spherical aberration is $S_a$, ratio B/A of a light flux diameter B to an entire effective diameter A of the coupling lens is $\gamma$, a ratio 2s/B of a light flux movement amount s at the time of objective lens shift to a light flux radius B/2 is $\delta$, and a Zernike astigmatism coefficient of off-axis astigmatism caused in the objective lens is $W_{as}$.

The optical element can have a surface shape which adds spherical aberration to the light passing through the optical element, the spherical aberration satisfying the formulae:

$$|W_{as}-[12S_a\gamma^4\delta^2+S_k(210\gamma^6\delta^2-60\gamma^4\delta^2)]|<|W_{as}| \quad (22),$$

and $$|-8S_a\gamma^4\delta+S_k(-120\gamma^6\delta^3-24\gamma^6\delta+40\gamma^4\delta)|<|-8S_a\gamma^4\delta| \quad (23),$$

where, in an entire effective diameter region of the optical element, an aberration coefficient of Zernike fourth-order spherical aberration is $S_a$, an aberration coefficient of Zernike sixth-order spherical aberration is $S_k$, a ratio B/A of a light flux diameter B to an entire effective diameter A of the coupling lens is $\gamma$, a ratio 2s/B of a light flux movement amount s at the time of objective lens shift to a light flux radius B/2 is $\delta$, and a Zernike astigmatism coefficient of field-of-view astigmatism caused in the objective lens is $W_{as}$.

The objective lens can have a surface shape which adds off-axis coma aberration to the light passing through the objective lens, the off-axis coma aberration satisfying the formula:

$$|W_{coma}-[-8S_a\gamma^4\delta]|<|-8S_a\gamma^4\delta| \quad (24),$$

where a Zernike coma aberration coefficient of field-of-view coma aberration of the light passing through the objective lens is $W_{coma}$, and in an entire effective diameter region of the optical element, an aberration coefficient of Zernike fourth-order spherical aberration is $S_a$, a ratio B/A of a light flux diameter B to an entire effective diameter A of the optical element is $\gamma$, and a ratio 2s/B of a light flux movement amount s at the time of objective lens shift to a light flux radius B/2 is $\delta$.

The optical element can have a surface shape which adds spherical aberration the light passing through the objective lens, the spherical aberration satisfying the formulae:

$$|W_{sa}-S|<|S| \quad (25)$$

$$S=S_a\gamma^4+S_k(-30\gamma^6\delta^2+5\gamma^6-5\gamma^4) \quad (26),$$

where a Zernike spherical aberration coefficient of the spherical aberration of the objective lens is $W_{sa}$, and in an entire effective diameter region of the coupling lens, an aberration coefficient of Zernike fourth-order spherical aberration is $S_a$, an aberration coefficient of Zernike sixth-order spherical aberration is $S_k$, a ratio B/A of a light flux diameter B to an entire effective diameter A of the coupling lens is γ, and a ratio 2s/B of a light flux movement amount s at the time of objective lens shift to a light flux radius B/2 is δ.

In the second embodiment of the present invention, the optical element is arranged on the optical path between the coupling lens and the objective lens, and the surface shape of the optical element is formed so that the preset spherical aberration amount is generated in the light irradiated from the light source at the position settled corresponding to the shift amount of the objective lens when the objective lens shifts, the position being where the light irradiated from the light source passes through the optical element.

A third embodiment of the present invention is an optical disc apparatus having an optical pickup unit which includes a light source that generates light irradiating an optical recording medium, and an objective lens that collects the light irradiated from the light source on a recording surface of the recording medium. The optical disc apparatus further includes a coupling lens arranged on an optical path between the light source and the objective. In the apparatus, a surface shape of the coupling lens is formed so that a preset spherical aberration amount is generated in the light irradiated from the light source at a position settled corresponding to a shift amount of the objective lens when the objective lens shifts, the position being where the light irradiated from the light source passes through the coupling lens.

In the third embodiment of the present invention, the coupling lens is arranged on the optical path between the light source and the objective lens, and the surface shape of the coupling lens is formed so that the preset spherical aberration amount is generated in the light irradiated from the light source at the position settled corresponding to the shift amount of the objective lens when the objective lens shifts, the position being where the light irradiated from the light source passes through the coupling lens.

A fourth embodiment of the present invention is an optical disc apparatus having an optical pickup unit which includes a light source that generates light irradiating an optical recording medium, an objective lens that collects the light irradiated from the light source on a recording surface of the recording medium, and a coupling lens arranged on an optical path between the light source and the objective lens. The optical disc apparatus further includes an optical element arranged on the optical path between the coupling lens and the objective lens. In the apparatus, a surface shape of the optical element is formed so that a preset spherical aberration amount is generated in the light irradiated from the light source at a position settled corresponding to a shift amount of the objective lens when the objective lens shifts, the position being where the light irradiated from the light source passes through the optical element.

In the fourth embodiment of the present invention, the optical element is arranged on the optical path between the coupling lens and the objective lens, and the surface shape of the optical element is formed so that the preset spherical aberration amount is generated in the light irradiated from the light source at the position settled corresponding to a shift amount of the objective lens when the objective lens shifts, the position being where the light irradiated from the light source passes through the optical element.

BRIEF DESCRIPTION OF DRAWINGS

FIG. 10 is a graph showing a relation between a distance from an optical axis and an aberration amount in the optical element of FIG. 9;

FIG. 20 is a diagram showing distances each between respective surfaces and refractive indexes in the optical system of FIG. 19;

FIG. 21 is a diagram showing an example of variables specifying surface shapes of a coupling lens and an objective lens of FIG. 19;

FIG. 23 is a diagram showing another example of variables specifying the surface shapes of the coupling lens and the objective lens of FIG. 19.

DETAILED DESCRIPTION OF THE EMBODIMENTS

Figure 1:
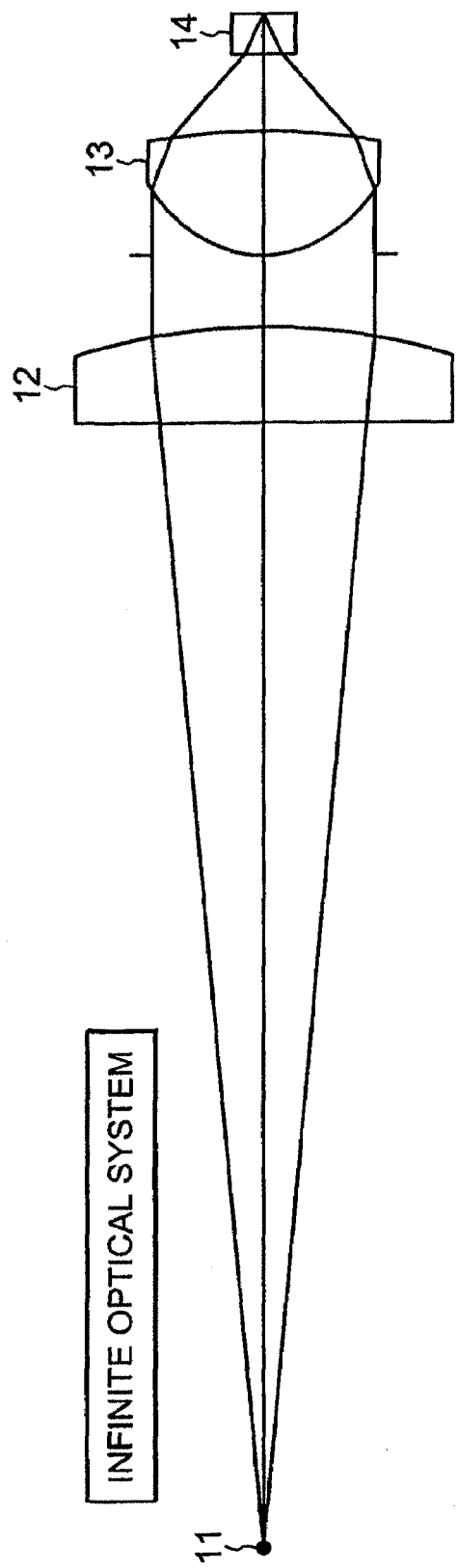
FIG. 1 is a diagram for explaining a related art infinite optical system.
Figure 2:
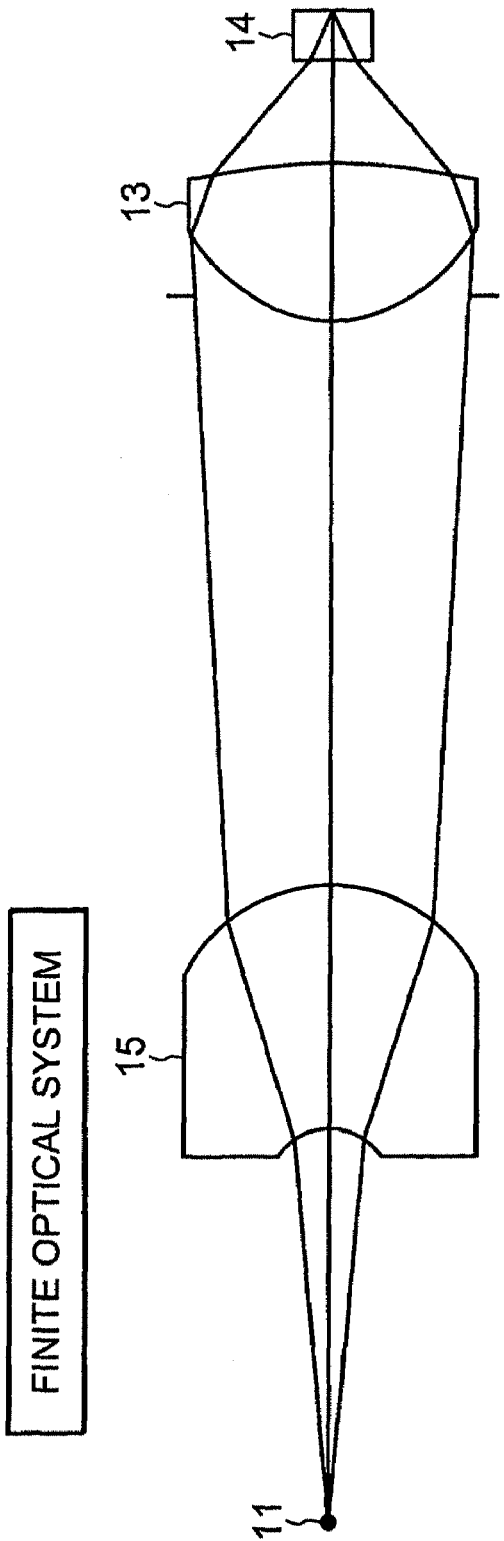
FIG. 2 is a diagram for explaining a related art finite optical system.

Hereinafter, a description of embodiments of the present invention is given. The exemplification of the correspondence relations between constituent requisites of the present invention and the embodiments described in the specification or drawings is as described below. This description is intended to confirm that the embodiments supporting the present invention are described in the specification or drawings. Accordingly, even if there is an embodiment, which is described in the specification or the drawings, but is not described here as an embodiment corresponding to a constituent requisite of the present invention, this does not mean that the embodiment does not correspond to the constituent requisite. On the contrary, even if an embodiment is described as the one corresponding to a constituent requisite, this does not means that the embodiment does not correspond to any constituent requisite other than the constituent requisite.

An optical pickup apparatus of a first embodiment of the present invention is an optical pickup apparatus including a light source (for example, a light source 201 in FIG. 4) that generates light irradiating an optical recording medium (for example, an optical recording medium 204 in FIG. 4), and an objective lens (for example, an objective lens 203 in FIG. 4) that collects the light irradiated from the light source on a recording surface of the recording medium. The apparatus further includes a coupling lens (for example, a coupling lens 205 in FIG. 4) arranged on an optical path between the light source and the objective lens. A surface shape of the coupling lens is formed so that a preset spherical aberration amount is generated in the light irradiated from the light source at a position settled corresponding to a shift amount of the objective lens when the objective lens shifts, the position being where the light irradiated from the light source passes through the coupling lens.

An optical pickup apparatus of a second embodiment of the present invention is an optical pickup apparatus including a light source (for example, the light source 201 in FIG. 8) that generates light irradiating an optical recording medium (for example, the optical recording medium 204 in FIG. 8), an objective lens (for example, the objective lens 203 in FIG. 8) that collects the light irradiated from the light source on a recording surface of the recording medium, and a coupling lens (for example, the coupling lens 205 in FIG. 8) arranged on an optical path between the light source and the objective lens. The apparatus further includes an optical element (for example, an optical element 206 in FIG. 8) arranged on the optical path between the coupling lens and the objective lens. A surface shape of the optical element is formed so that a preset spherical aberration amount is generated in the light irradiated from the light source at a position settled corresponding to a shift amount of the objective lens when the objective lens shifts, the position being where the light irradiated from the light source passes through the optical element.

In this optical pickup apparatus, the optical element can be constructed integrally with another optical element (for example, an expander lens) arranged in the optical disc apparatus in advance for correcting the spherical aberration caused by fluctuations in thickness of the optical disc or fluctuations in environmental temperature.

An optical disc apparatus of a third embodiment of the present invention is an optical disc apparatus having an optical pickup unit (for example, an optical pickup unit 101 in FIG. 3) which includes a light source (for example, the light source 201 in FIG. 4) that generates light irradiating an optical recording medium (for example, the optical recording medium 204 in FIG. 4), and an objective lens (for example, the objective lens 203 in FIG. 4) that collects the light irradiated from the light source on a recording surface of the recording medium. The optical disc apparatus further includes a coupling lens (for example, the coupling lens 205 in FIG. 4) arranged on an optical path between the light source and the objective lens. In the apparatus, a surface shape of the coupling lens is formed so that a preset spherical aberration amount is generated in the light irradiated from the light source at a position settled corresponding to a shift amount of the objective lens when the objective lens shifts, the position being where the light irradiated from the light source passes through the coupling lens.

An optical disc apparatus of a fourth embodiment of the present invention is an optical disc apparatus having an optical pickup unit (for example, the optical pickup unit 101 in FIG. 3) which includes a light source (for example, the light source 201 in FIG. 8) that generates light irradiating an optical recording medium (for example, the optical recording medium 204 in FIG. 8), an objective lens (for example, the objective lens 203 in FIG. 8) that collects the light irradiated from the light source on a recording surface of the recording medium, a coupling lens (for example, the coupling lens 205 in FIG. 8) arranged on the optical path between the light source and the objective lens. The optical disc apparatus further includes an optical element (for example, the optical element 206 in FIG. 8) arranged on the optical path between the coupling lens and the objective lens. In the apparatus, a surface shape of the optical element is formed so that a preset spherical aberration amount is generated in the light irradiated from the light source at a position settled corresponding to a shift amount of the objective lens when the objective lens shifts, the position being where the light irradiated from the optical element passes through the optical element.

Hereinafter, referring to the drawings, the embodiments of the present invention are described.

Figure 3:
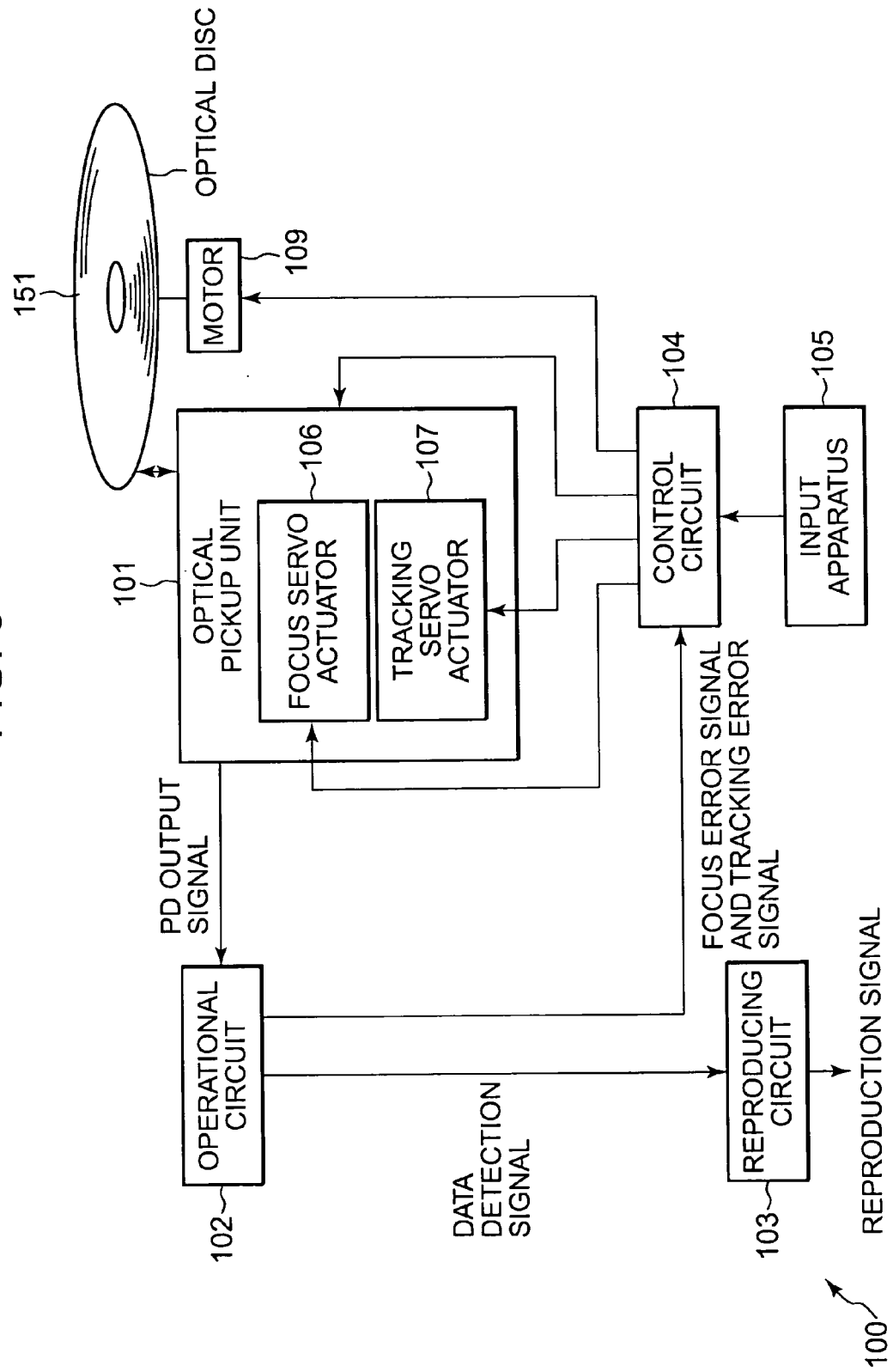
FIG. 3 is a block diagram showing a configuration example according to one embodiment of an optical disc apparatus to which the present invention is applied.

FIG. 3 is a block diagram showing a configuration example according to one embodiment of the optical disc apparatus to which the present invention is applied.

As shown in the figure, according to the present embodiment, the optical pickup unit 101 is adapted such that a light is generated from a built-in light source, for example, a laser diode, is collected on an optical disc 151 through a predetermined optical system which will be described later, its reflected light is detected by a light detecting unit having a plurality of light receiving units, and an output signal of each of the light receiving units is outputted to an arithmetic circuit 102 as a PD output signal.

The arithmetic circuit 102 calculates a data detection signal (RF signal) for optical disc playback, a focus error signal indicating a displacement of the focus of the laser light in an optical axis direction, and a tracking error signal indicating a displacement of tracking in a radial direction of the optical disc to output the data detection signal to a reproducing circuit 103, and to output the focus error signal and the tracking error signal to a control circuit 104.

The reproducing circuit 103 equalizes the data detection signal supplied from the arithmetic circuit 102, and then, binarizes it, and further, outputs the signal demodulated while being subjected to error correction to a predetermined apparatus as a reproduced signal.

The control circuit 104 controls a focus servo actuator 106 in accordance with the focus error signal supplied from the arithmetic circuit 102 so as to, for example, move the objective lens of the optical pickup unit 101 along the optical axis direction to adjust the focus, and controls a tracking servo actuator 107 according to the tracking error signal supplied from the arithmetic circuit 102 so as to, for example, move the optical pickup unit 101 along the radial direction of the optical disc 151 to adjust tracking. The focus servo actuator 106 and the tracking servo actuator 107 are actually constructed as a single actuator and the objective lens described later is mounted on the actuator.

The control circuit 104 also controls a motor 109 so as to rotate the optical disc 151 at a predetermined speed.

The control circuit 104 receives the signal corresponding to operation by a user from an input apparatus 105, and controls the respective circuits in accordance with the signal.

Figure 4:
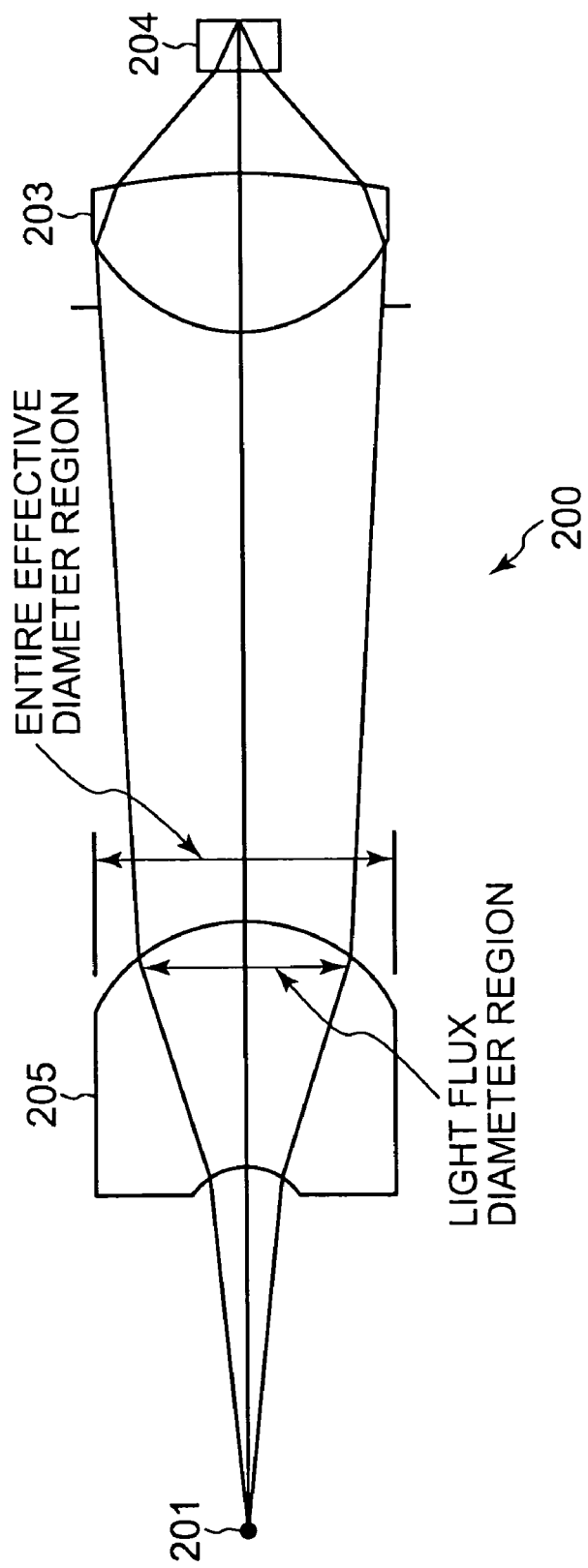
FIG. 4 is a diagram showing a configuration example of an optical pickup unit of FIG. 3.

The optical pickup unit 101 is constructed as an optical pickup apparatus employing a so-called finite optical system, and, for example, has a configuration as shown in FIG. 4. In the figure, an optical pickup apparatus 200 is a configuration example of one embodiment of the optical pickup unit 101, which is an optical pickup apparatus employing the so-called finite optical system and having the coupling lens 205 that converts the light irradiated from the light source 201 to a light flux of a predetermined angle, the objective lens 203 that collects the light passing through the coupling lens 205 on a recording surface of the recording medium 204. The recording medium 204 is a simplified form of the optical disc 151 of FIG. 3, and the recording medium 204 and the optical disc 151 are substantially identical.

Although the objective lens 203 is designed to satisfy a sine condition and is constructed so that spherical aberration and coma aberration as off-axis aberrations are not caused in the light passing through the objective lens 203, astigmatism is caused.

In a case where a surface shape of the coupling lens 205 is designed not to cause aberration in the light passing through the coupling lens 205, for example, moving, or shifting, the objective lens 203 for performing tracking servo causes so-called objective lens shift and an astigmatism amount by the objective lens 203 becomes a quadratic function of an objective lens shift amount. Accordingly, as a shift amount of the objective lens 203 becomes larger, effects of the astigmatism becomes larger in the optical pickup apparatus employing the finite optical system.

Figure 5:
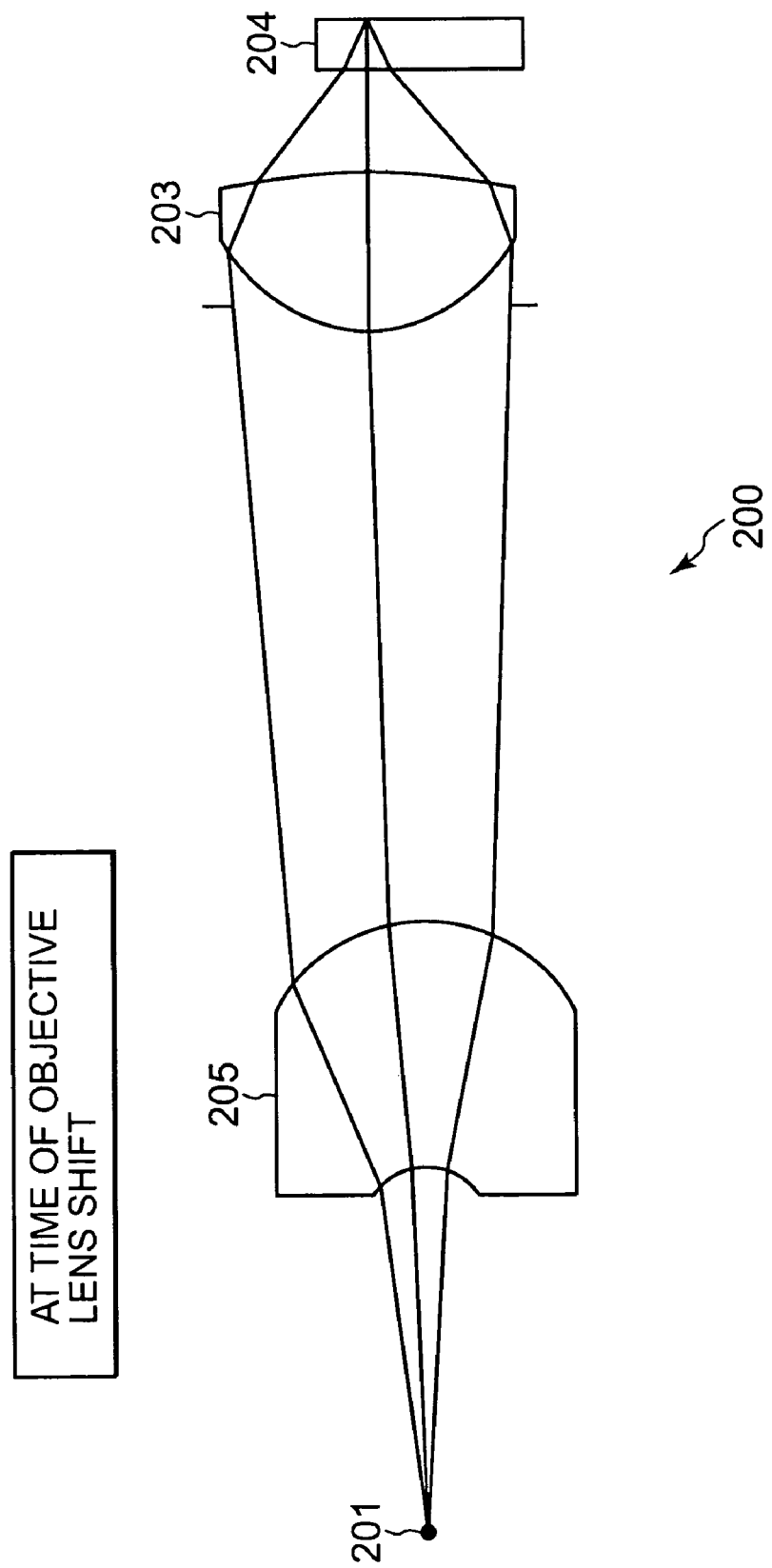
FIG. 5 is a diagram showing an example when objective lens shift occurs in the optical pickup unit of FIG. 4.

FIG. 5 is a diagram showing an example case where the objective lens shift occurs in the optical pickup apparatus 200 in FIG. 4. In this figure, as compared with the case of FIG. 4, the objective lens 203 moves in a direction perpendicular to the optical axis.

Since the aberration amount caused by the above-described shift of the objective lens is not so large that the system margin is collapsed when recording or reproduction of information is performed for an optical recording medium such as a CD and an MD of a low NA, for example, such aberration may be acceptable. However, in a case where recording or reproduction of information is performed for an optical recording medium such as a DVD and a UMD of a high NA, there is a possibility that the aberration has indispensable influences.

Therefore, according to the present invention, in order to correct the above-described aberration occurring with the shift of the objective lens 203, the characteristics of the coupling lens 205 are changed, for example, by designing the surface shape of the lens into a predetermined shape.

In a case where the objective lens shift occurs, a passing position of a light beam irradiated from the light source 201 within the coupling lens 205 differs.

Figure 6:
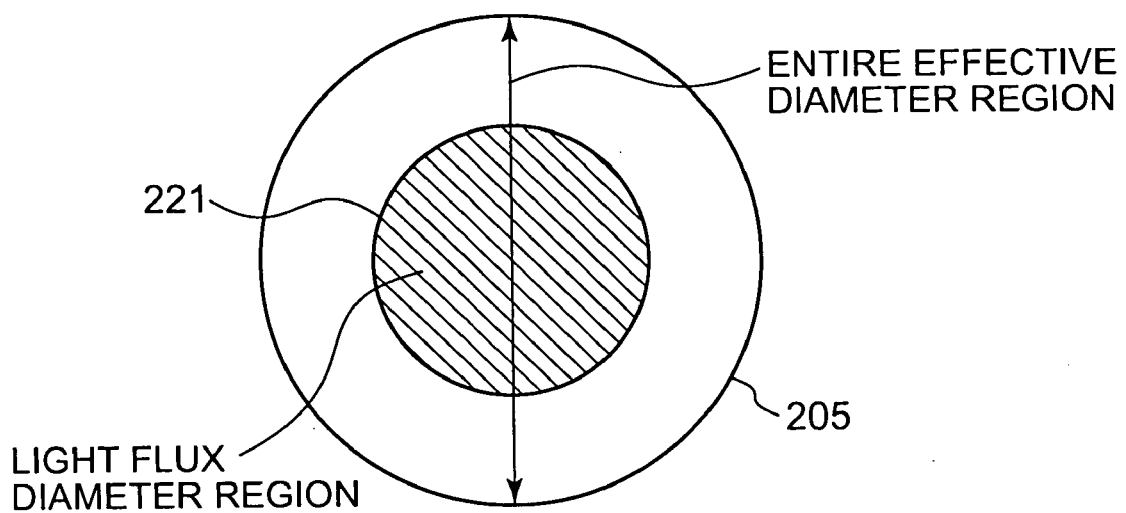
FIG. 6 is a diagram for explaining a position in a coupling lens where a light passes when the objective lens shift does not occur.

For example, in a state where the objective lens shift does not occur as shown in FIG. 4, the passing position, within the coupling lens 205, of the light beam irradiated from the light source 201 is as shown in FIG. 6. FIG. 6 is a diagram when the coupling lens 205 is seen from a point on an optical axis of the light beam irradiated from the light source 201. In this figure, within an entire effective diameter region of the coupling lens 205, which is almost equal to a diameter of the coupling lens 205, a light-flux diameter region 221 through which a light flux of the light beam irradiated from the light source 201 passes is arranged in the central portion concentrically with the entire effective diameter region.

Figure 7:
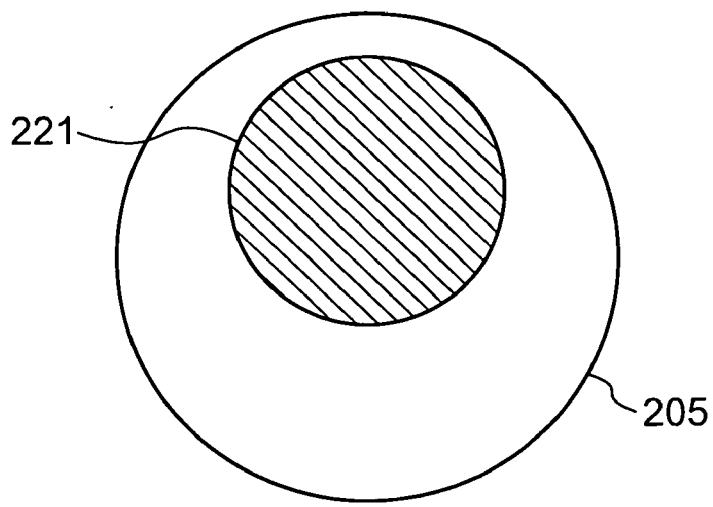
FIG. 7 is a diagram for explaining the position in the coupling lens where a light passes when the objective lens shift occurs.

On the other hand, in the state where the objective lens shift occurs as shown in FIG. 5, the passing position, within the coupling lens 205, of the light beam irradiated from the light source 201 is as shown in FIG. 7. FIG. 7, similar to FIG. 6, is a diagram when the coupling lens 205 is seen from a point on the optical axis of the light beam irradiated from the light source 201. In the figure, within the entire effective diameter region of the coupling lens 205, the light-flux diameter region 221 through which the light flux of the light beam irradiated from the light source 201 is arranged at a position displaced upward in the figure, as compared with the case of FIG. 6.

Thus, since the passing position within the coupling lens 205 of the light beam irradiated from the light source 201 differs depending on a lens shift amount of the objective lens 203, advance optimization by changing the surface shape of the lens at predetermined ratios according to the passing position within the coupling lens 205 or the like allows the aberration occurring with the shift of the objective lens 205 to be corrected by the characteristics of the coupling lens 205.

From analysis according to Zernike polynomial expansion of wavefront aberration of the entire effective diameter of the coupling lens 205, a relation formula can be derived as follows. If an aberration coefficient of Zernike fourth-order spherical aberration of spherical aberration, which is added to the entire effective diameter region of the coupling lens 205, is $S_a$, a ratio B/A of a light flux diameter B to an entire effective diameter A of the coupling lens is $\gamma$, and a ratio 2s/B of a light flux movement amount s at the time of objective lens shift to a light flux radius B/2 is $\delta$, an aberration coefficient A of astigmatism and an aberration coefficient C of coma aberration, which stem from the coupling lens, are expressed by formula (1).

$$A = 12 S_a \gamma^4 \delta^2$$

$$C = -8 S_a \gamma^4 \delta \qquad (1),$$

where $\gamma = B/A$, and $\delta = 2s/B$.

Accordingly, by giving the appropriate fourth-order spherical aberration $S_a$ as the aberration amount of the entire effective diameter of the coupling lens 205, arbitrary astigmatism changing in a quadratic function of the objective lens shift amount can be generated by the coupling lens 205 at the time of objective lens shift.

In other words, if a Zernike astigmatism coefficient of the astigmatism, i.e., off-axis astigmatism, generated by the objective lens 203 is $W_{as}$, the surface shape of the coupling lens 205 is optimized so as to give the fourth-order spherical aberration $S_a$ satisfying formula (2), which enables the construction of an optical pickup apparatus improved in field-of-view characteristics with less astigmatism even if the objective lens shift occurs.

$$|W_{as} - 12 S_a \gamma^4 \delta^2| < |W_{as}| \qquad (2)$$

With this arrangement, the optical pickup employing the finite optical system is constructed, so that the apparatus can be downsized and reduced in thickness. Additionally, the occurrence of the aberration accompanying the objective lens shift can be suppressed, and for example, even in recording or reproduction of information for the optical recording medium such as a DVD and a UMD of a large NA, stable operation can be realized.

In the foregoing, the case where the astigmatism caused by the shift of the objective lens 203 is corrected by finding the appropriate aberration coefficient $S_a$ of Zernike fourth-order spherical aberration is described. In this case, since the coma aberration coefficient C in the above formula (1) is also a function of the aberration coefficient $S_a$ of Zernike fourth-order spherical aberration, there is a possibility that some values of optical parameters such as γ and δ increase the coma aberration amount even if the astigmatism caused by the shift of the objective lens 203 is corrected.

Thus, in a case where the coma aberration that can occur with the correction of the astigmatism is further corrected, the surface shape of the coupling lens 205 may be optimized in the following method.

If an aberration coefficient of Zernike fourth-order spherical aberration of spherical aberration, which is added to the entire effective diameter region of the coupling lens 205, is $S_a$, an aberration coefficient of Zernike six-order spherical aberration is $S_k$, a ratio B/A of the light flux diameter B to the entire effective diameter A of the coupling lens 205 is γ, and a ratio 2s/B of the light flux movement amount s at the time of objective lens shift to the light flux radius B/2 is δ, the aberration coefficient A of astigmatism and the aberration coefficient C of coma aberration, which stem from the coupling lens 205, can be expressed by formula (3).

$$A = 12 S_a \gamma^4 \delta^2 + S_k (210 \gamma^6 \delta^2 - 60 \gamma^4 \delta^2)$$

$$C = -8 S_a \gamma^4 \delta + S_k (-210 \gamma^6 \delta^3 - 24 \gamma^6 \delta + 40 \gamma^4 \delta) \quad (3),$$

where γ=B/A, and δ=2s/B.

Accordingly, by giving the appropriate fourth-order spherical aberration $S_a$ and the sixth-order spherical aberration $S_k$ as the aberration amount of the entire effective diameter of the coupling lens 205, appropriate coma aberration and arbitrary astigmatism changing in a quadratic function of the objective lens shift amount can be generated by the coupling lens 205 at the time of objective lens shift.

If a Zernike astigmatism coefficient of the field-of-view astigmatism (off-axis astigmatism) generated in the objective lens 203 is $W_{as}$, the surface shape of the coupling lens 205 is optimized so as to give the fourth-order spherical aberration $S_a$ and the six-order spherical aberration $S_k$ simultaneously satisfying formulae (4) and (5), which enables an optical pickup apparatus further improved in field-of-view characteristics to be constructed.

$$|W_{as} - [12 S_a \gamma^4 \delta^2 + S_k (210 \gamma^6 \delta^2 - 60 \gamma^4 \delta^2)]| < |W_{as}| \quad (4)$$

$$|-8 S_a \gamma^4 \delta + S_k (-120 \gamma^6 \delta^3 - 24 \gamma^6 \delta + 40 \gamma^4 \delta)| < |-8 S_a \gamma^4 \delta| \quad (5)$$

With this arrangement, the optical pickup employing the finite optical system is constructed, so that the apparatus can be downsized and reduced in thickness. Additionally, the coma aberration, which may possibly occur with the correction of the astigmatism, is further corrected, and the occurrence of the aberration due to the objective lens shift can be further suppressed, and for example, even in recording or reproduction of information for the optical recording medium such as a DVD and a UMD of a large NA, stable operation can be realized.

Figure 8:
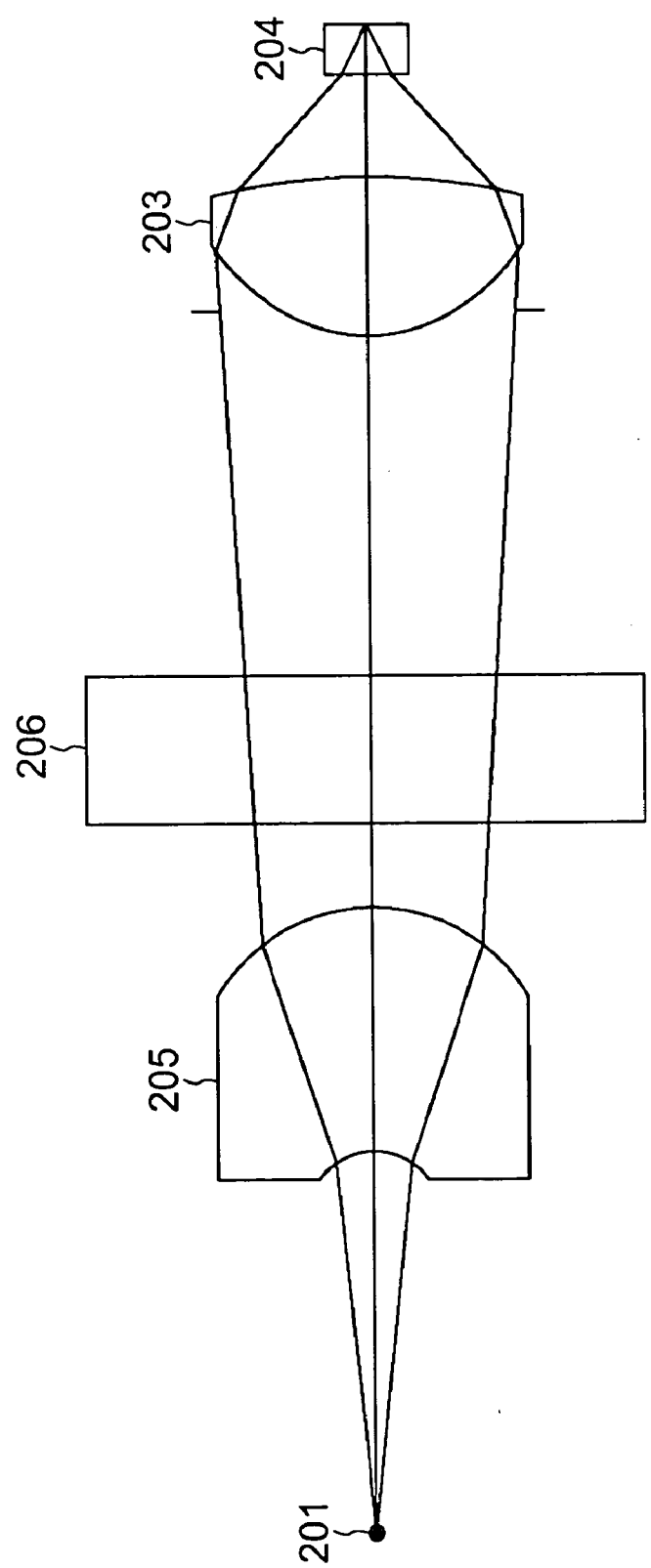
FIG. 8 is a diagram showing another configuration example of the optical pickup unit of FIG. 3.

While in the foregoing, the example in which the surface shape of the coupling lens 205 is optimized so that the appropriate fourth-order spherical aberration $S_a$ and sixth-order spherical aberration $S_k$ are given with respect to the entire effective diameter of the coupling lens 205 is described, instead of optimizing the surface shape of the coupling lens 205, for example, an optical element such as a lens and a liquid crystal element for adding appropriate spherical aberration may be arranged in the optical path of the optical pickup apparatus, as shown in FIG. 8.

FIG. 8 is a block diagram showing another configuration example of the optical pickup unit 101. In this figure, different from the case of FIG. 4, the optical element 206 for adding appropriate spherical aberration is arranged between the coupling lens 205 and the objective lens 203. Furthermore, in this example, the surface shape of the coupling lens 205 is not particularly optimized with above-described formulae (2), (4), (5) and the like, but the coupling lens 205 is constructed so as to have uniform characteristics across the entire effective diameter (the one equivalent to a related art coupling lens is used as the coupling lens 205). Parts other than the foregoing are the same as those in the case of FIG. 4.

Figure 9:
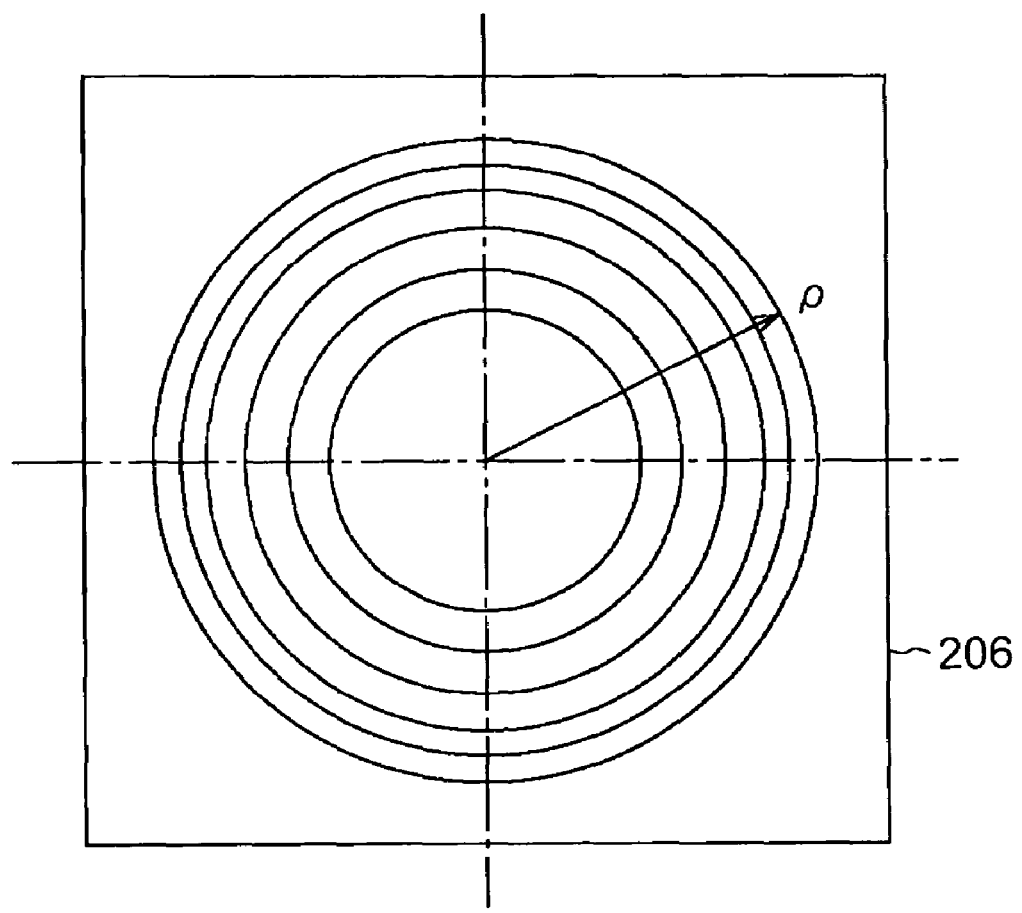
FIG. 9 is a structure example of an optical element of FIG. 8.

The optical element 206 is constructed as shown in FIG. 9, for example. FIG. 9 is a diagram when the optical element 206 of FIG. 8 is seen from a point on the optical axis of the light irradiated from the light source 201. As shown in this figure, the optical element 206 is constructed so as to generate the aberration amount differing according to a distance ρ from a center, that is, a point where a vertical broken line and a horizontal broken line in the figure cross, of the optical axis of the passing light.

FIG. 10 is a diagram showing an example of characteristics of the aberration amount generated in the optical element 206. In this figure, the vertical axis indicates the aberration amount, and the horizontal axis indicates a value of ρ. For example, in a case where the optimal characteristics found by the above-described formulae (2), (4), (5) and the like are given by a line 301, the optical element 206 is constructed so as to have characteristics indicated by a line 302, which enables the characteristics indicated by the line 301 to be approximated. As a result, the aberration caused by the objective lens shift can be corrected as in the case where the surface shape of the coupling lens 205 is optimized.

The optical element 206 does not need to be provided only for correcting the astigmatism occurring with the shift of the objective lens 203, but may be made of an optical element, such as an expander lens, arranged in the optical disc apparatus in advance for correcting the spherical aberration caused by fluctuations in thickness of an optical disc, fluctuations in environmental temperature or the like.

Furthermore, the optical element 206 is not limited to the one made of a lens or the like, but can be made of a liquid crystal element, for example. This allows the surface shape of the optical element 206 to be easily adjusted.

While in the foregoing, the case where the aberration occurring with the shift of the objective lens 203 is corrected by the coupling lens 205 or the optical element 206 is described, the aberration can also be corrected by the objective lens 203. In this case, the surface shape of the objective lens 203, which is normally designed so as to satisfy the sine condition, may be intentionally changed to add appropriate off-axis coma aberration to the light passing through the objective lens 203.

More specifically, if a Zernike coma aberration coefficient of the off-axis coma aberration of the objective lens 203 is $W_{coma}$, an aberration coefficient of Zernike fourth-order spherical aberration of spherical aberration, which is added to the entire effective diameter region of the coupling lens 205, is $S_a$, a ratio B/A of the light flux diameter B to the entire effective diameter A of the coupling lens is γ, and a ratio 2s/B of the light flux movement amount s at the time of objective lens shift to the light flux radius B/2 is δ, the surface shape of the objective lens may be optimized so as to give the coma aberration coefficient satisfying formula (6).

$$|W_{coma} - [-8S_a\gamma^4\delta]| < |-8S_a\gamma^4\delta| \qquad (6)$$

By combining the objective lens 203 whose surface shape is optimized as described above, and the coupling lens 205 whose surface shape is optimized so as to give the fourth-order spherical aberration $S_a$ satisfying formula (2), a finite optical system more favorably improved in field-of-view characteristics can be constructed.

The spherical aberration which is added to the light passing through the entire effective diameter region of the coupling lens 205 or the optical element 206 by optimizing the surface shape of the above-described entire effective diameter region of the coupling lens 205 or the optical element 206 allows the spherical aberration to be generated in the light flux diameter region. This spherical aberration can be expressed by formula (7), where a spherical aberration coefficient is S.

$$S = S_a\gamma^4 + S_k(-30\gamma^6\delta^2 + 5\gamma^6 - 5\gamma^4) \qquad (7)$$

Although in many cases, the above-described spherical aberration is small enough not to largely affect the characteristics of the optical pickup apparatus or small enough to be ignored, adding the appropriate spherical aberration to the objective lens 203 in advance allows the spherical aberration caused by the coupling lens 205 to be corrected. In other words, while the objective lens 203 is normally designed to satisfy the sine condition as described above, by changing its surface shape to add the appropriate spherical aberration to the light passing through the objective lens 203, the spherical aberration caused by the coupling lens 205 can also be corrected.

In a case of adding the appropriate spherical aberration to the objective lens 203, the surface shape of the objective lens 203 may be optimized so as to give the spherical aberration $W_{sa}$ satisfying formula (8).

$$|W_{sa} - S| < |S| \qquad (8)$$

$W_{sa}$: Zernike spherical aberration coefficient of spherical aberration of objective lens With this arrangement, the optical pickup employing the finite optical system is constructed, so that the apparatus can be downsized and reduced in thickness. Furthermore, in addition to the correction of the astigmatism due to the shift of the objective lens 203, the spherical aberration of the coupling lens 205 is further corrected, so that the occurrence of the aberration accompanying the objective lens shift can be further suppressed, and for example, even in recording or reproduction of information for the optical recording medium such as a DVD and a UMD of a large NA, stable operation can be realized.

Next, effects in the case where the astigmatism occurring with the shift of the objective lens 203 is corrected as described above are described.

Figure 11A:
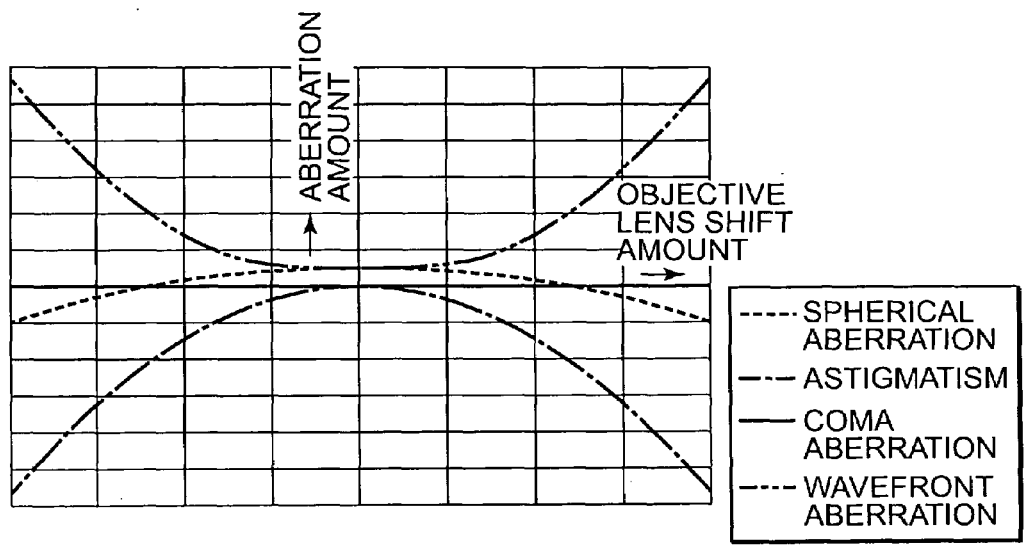
FIG. 11A and FIG. 11B are graphs showing relations between an objective lens shift amount and an aberration amount in an objective lens and a coupling lens in a related art finite optical system.
Figure 11B:
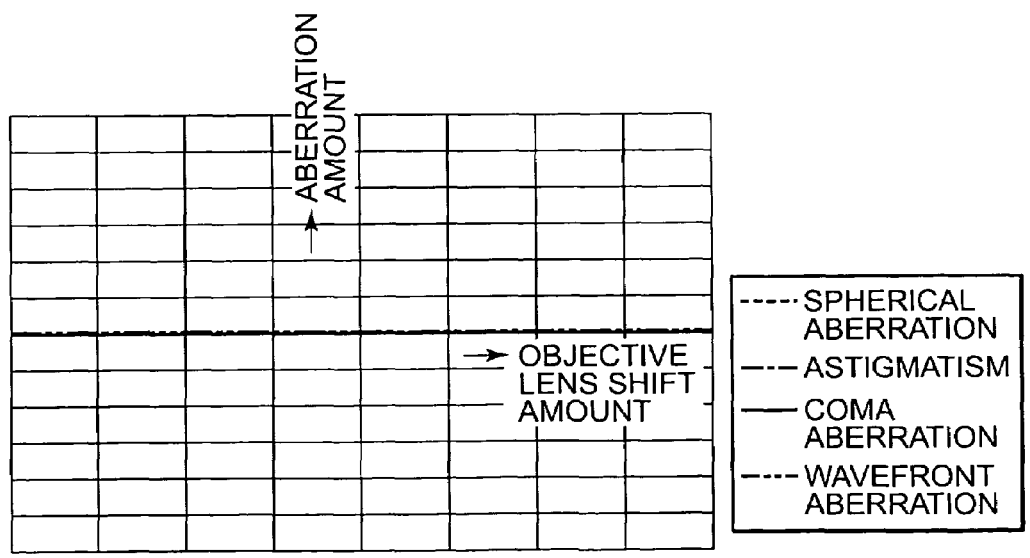

FIGS. 11A and 11B are graphs indicating relations between the objective lens shift amount and the aberration amount in the related art finite optical system. In FIGS. 11A and 11B, the vertical axis indicates an aberration amount, and the horizontal axis indicates an objective lens shift amount. In FIG. 11A, a spherical aberration amount, astigmatism amount, coma aberration amount, and wavefront aberration amount according to the objective lens shift amount of the objective lens are shown, respectively, as a graph, and in FIG. 11B, a spherical aberration amount, astigmatism amount, coma aberration amount, and wavefront aberration amount according to the objective lens shift amount of the coupling lens (objective lens shift amount caused by the shift of the objective lens) are shown, respectively, as a graph.

As shown in FIG. 11B, the related art coupling lens is constructed such that the surface shape thereof is not optimized to correct the astigmatism occurring with the shift of the objective lens, and thus the spherical aberration amount, astigmatism amount, coma aberration amount, and wavefront aberration amount are 0 regardless of the objective lens shift amount.

Figure 12:
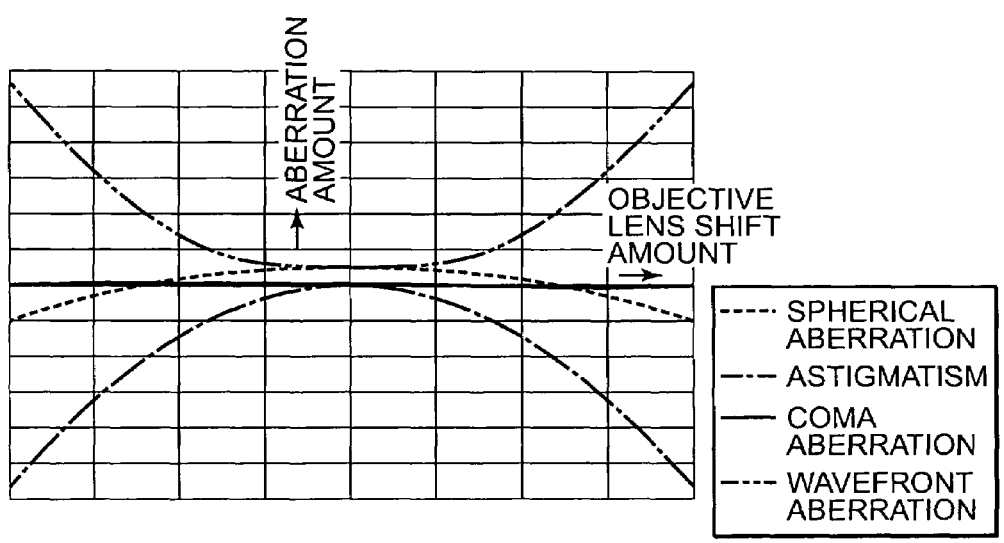
FIG. 12 is a graph showing a relation between the objective lens shift amount and the aberration amount in the entire finite optical system corresponding to FIG. 11.

In a case where the optical pickup apparatus employing the finite optical system made of the objective lens having the characteristics shown in FIG. 11A and the coupling lens having the characteristics shown in FIG. 11B is constructed, the characteristics of the optical pickup apparatus, i.e., entire optical system, are as shown in FIG. 12. In FIG. 12, also with the vertical axis indicating an aberration amount, and the horizontal axis indicating an objective lens shift amount, a spherical aberration amount, astigmatism amount, coma aberration amount, and wavefront aberration amount according to the objective lens shift amount of the optical pickup apparatus are shown, respectively, as a graph.

As shown in the figure, in the related art finite optical system, i.e., optical pickup apparatus, since the astigmatism occurring with the shift of the objective lens is not corrected, characteristics similar to those of the objective lens are exhibited in the entire optical system.

Figure 13A:
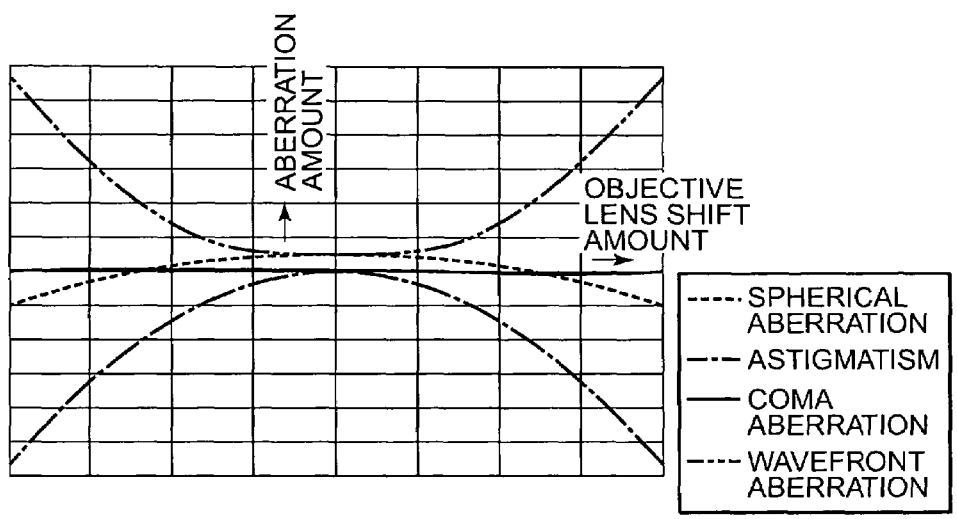
FIG. 13A and FIG. 13B are graphs showing relations between an objective lens shift amount and an aberration amount in an objective lens and a coupling lens in a finite optical system to which the present invention is applied.
Figure 13B:
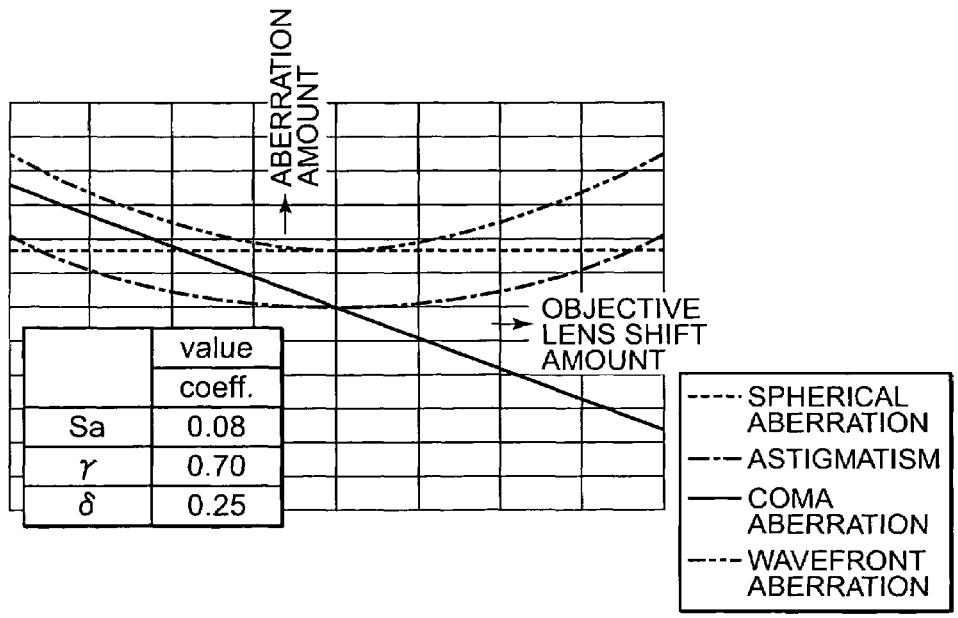

FIGS. 13A and 13B are graphs showing relations between the objective lens shift amount and the aberration amount in the finite optical system in a case where the surface shape of the coupling lens is optimized. In the FIGS. 13A and 13B, the vertical axis indicates an aberration amount, and the vertical axis indicates an objective lens shift amount. In FIG. 13A, a spherical aberration amount, astigmatism amount, coma aberration amount, and wavefront aberration amount according to the objective lens shift amount of the objective lens are shown, respectively, as a graph, and in FIG. 13B, a spherical aberration amount, astigmatism amount, coma aberration amount, and wavefront aberration amount according to the objective lens shift amount in the coupling lens are shown, respectively, as a graph.

The surface shape of the coupling lens having the characteristics shown in FIG. 13B has been optimized so as to give the appropriate aberration coefficient $S_a$ of Zernike fourth-order spherical aberration found by the above-described formulae (1) and (2). In this example, there is used a coupling lens whose surface shape is optimized so that the value of the aberration coefficient $S_a$ of the Zernike fourth-order spherical aberration becomes 0.08 (coeff.), the value of γ, which is the ratio B/A of the light flux diameter B to the entire effective diameter A of the coupling lens, becomes 0.70 (coeff.) and the value of δ, which is the ratio 2s/B of the light flux movement amount s at the time of objective lens shift to the light flux diameter B/2, becomes 0.25 (coeff.).

Figure 14:
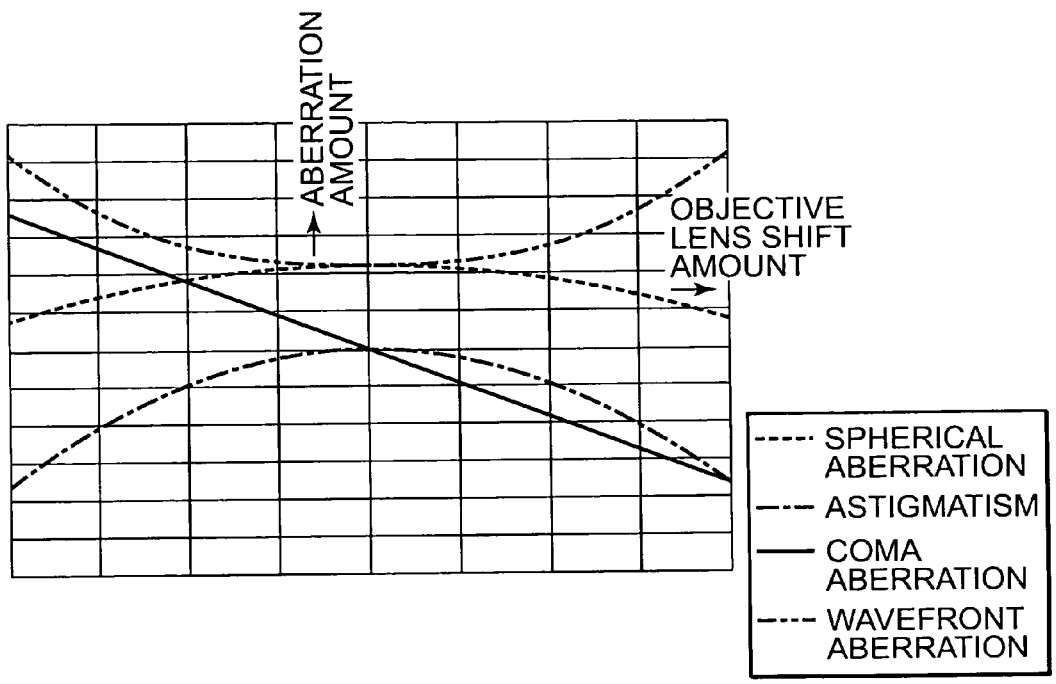
FIG. 14 is a graph showing a relation between the objective lens shift amount and the aberration amount in the entire finite optical system corresponding to FIG. 13.

In a case where the optical pickup apparatus employing the finite optical system made of the objective lens having the characteristics shown in FIG. 13A and the coupling lens having the characteristics shown in FIG. 13B is constructed, the characteristics of the optical pickup apparatus, i.e., entire optical system, are as shown in FIG. 14. In FIG. 14, also, with the vertical axis indicating an aberration amount, and the horizontal axis indicating an objective lens shift amount, a spherical aberration amount, astigmatism amount, coma aberration amount, and wavefront aberration amount according to the objective lens shift amount of the optical pickup apparatus are shown, respectively, as a graph.

As shown in the figure, since the surface shape of the coupling lens is optimized to correct the astigmatism occurring with the shift of the objective lens, in comparison with the case of the related art finite optical system (FIG. 12), increases in the astigmatism amount and in the wavefront aberration amount accompanying the objective lens shift amount are suppressed, so that the field-of-view characteristics of the optical pickup apparatus are improved.

Figure 15A:
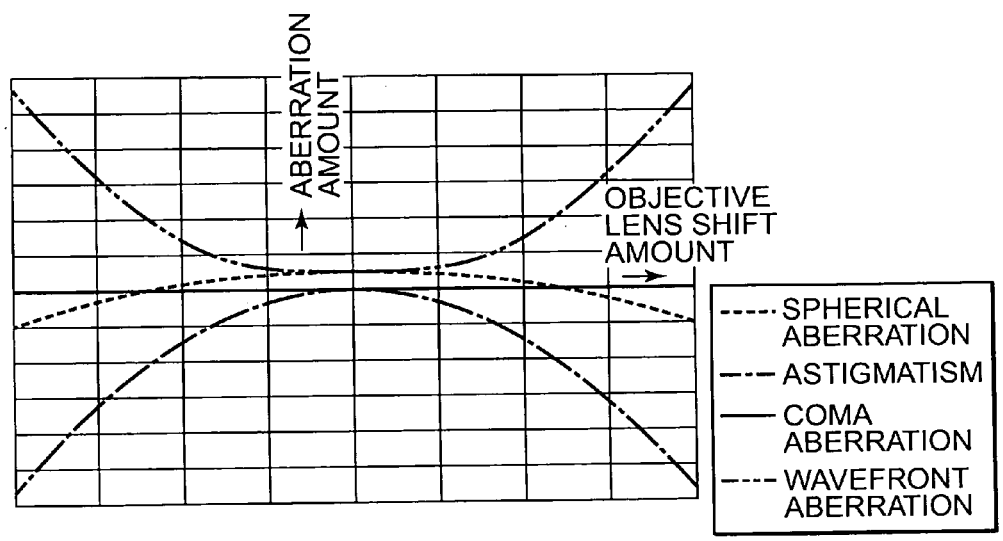
FIG. 15A and FIG. 15B are graphs showing another example of the relations between the objective lens shift amount and the aberration amount in the objective lens and the coupling lens of the finite optical system to which the present invention is applied.
Figure 15B:
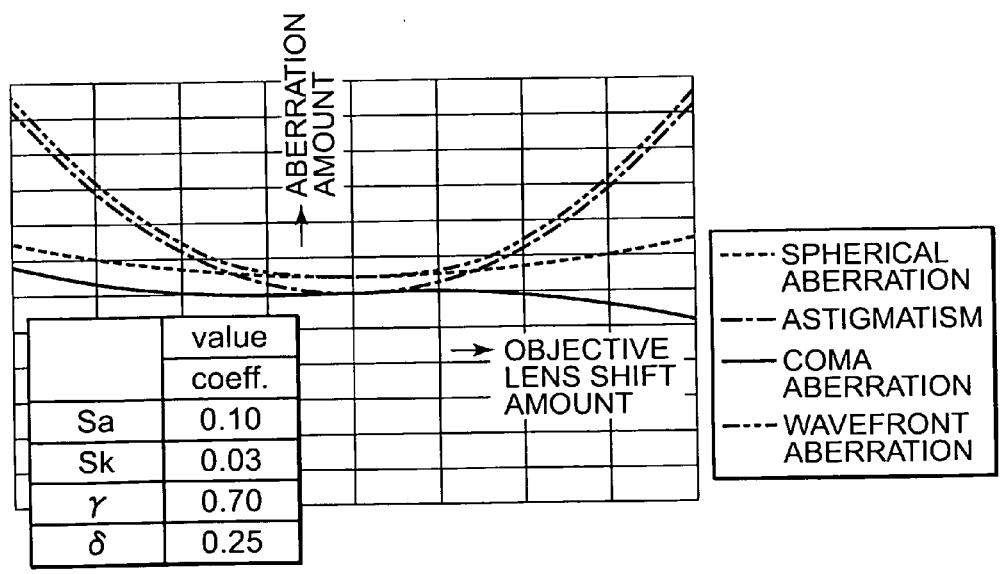

FIGS. 15A and 15B are graphs showing relations between the objective lens shift amount and the aberration amount in the finite optical system when the surface shape of the coupling lens is further optimized. In the FIGS. 15A and 15B, the vertical axis indicates an aberration amount, and the vertical axis indicates an objective lens shift amount. In FIG. 15A, a spherical aberration amount, astigmatism amount, coma aberration amount, and wavefront aberration amount according to the objective lens shift amount of the objective lens are shown respectively, as a graph, and in FIG. 15B, a spherical aberration amount, astigmatism amount, coma aberration amount, and wavefront aberration amount according to the objective lens shift amount in the coupling lens are shown, respectively, as a graph.

The surface shape of the coupling lens having the characteristics shown in FIG. 15B has been optimized so as to give the appropriate aberration coefficient $S_a$ of Zernike fourth-order spherical aberration and sixth-order spherical aberration $S_k$ found by the above-described formulae (3), (4) and (5). In this example, there is used a coupling lens whose surface shape is optimized so that the value of the aberration coefficient $S_a$ of Zernike fourth-order spherical aberration becomes 0.10 (coeff.), the value of the aberration coefficient $S_k$ of Zernike sixth-order spherical aberration becomes 0.03 (coeff.), the value of $\gamma$, which is the ratio B/A of the light flux diameter B to the entire effective diameter A of the coupling lens, becomes 0.70 (coeff.) and the value of $\delta$, which is the ratio 2s/B of the light flux movement amount s at the time of objective lens shift to the light flux radius B/2, becomes 0.25 (coeff.).

Figure 16:
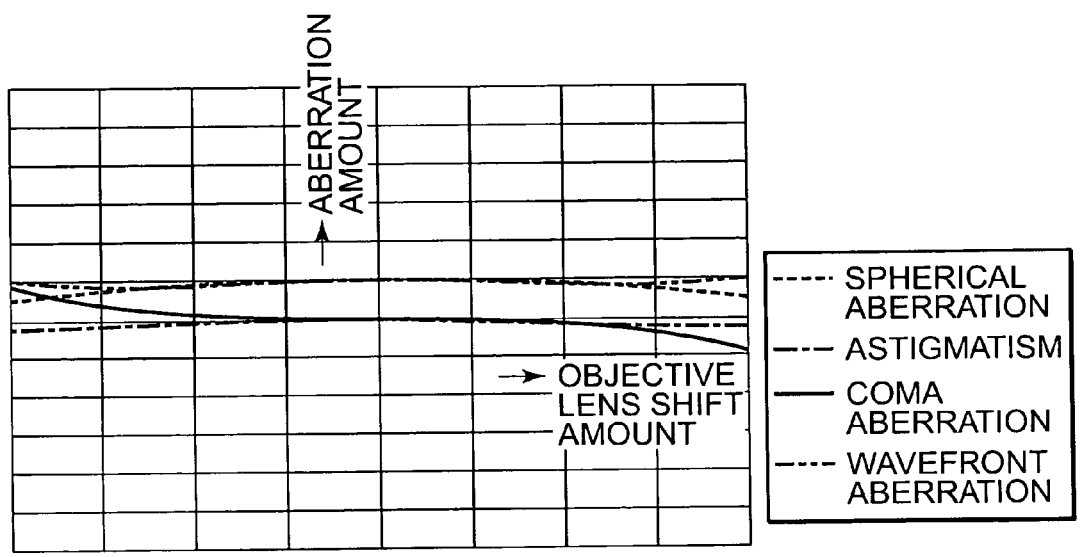
FIG. 16 is a graph showing the relation between the objective lens shift amount and the aberration amount in the entire finite optical system corresponding to FIG. 15.

In the case where the optical pickup apparatus employing the finite optical system made of the objective lens having the characteristics shown in FIG. 15A and the coupling lens having the characteristics shown in FIG. 15B is constructed, the characteristics of the optical pickup apparatus, i.e., entire optical system, are as shown in FIG. 16. In FIG. 16, also, with the vertical axis indicating an aberration amount, and the horizontal axis indicating an objective lens shift amount, a spherical aberration amount, astigmatism amount, coma aberration amount, and wavefront aberration amount according to the objective lens shift of the optical pickup apparatus are shown, respectively, as a graph.

As shown in the figure, since the surface shape of the coupling lens is further optimized to correct the coma aberration occurring with the correction of the astigmatism occurring with the shift of the objective lens, in comparison with the case of FIG. 12 and even in comparison with the case of FIG. 14, increases in the spherical aberration amount, in the astigmatism amount, in the coma aberration amount, and in the wavefront aberration amount according to the objective lens shift amount are suppressed, so that the field-of-view characteristics of the optical pickup apparatus are further improved.

Figure 17A:
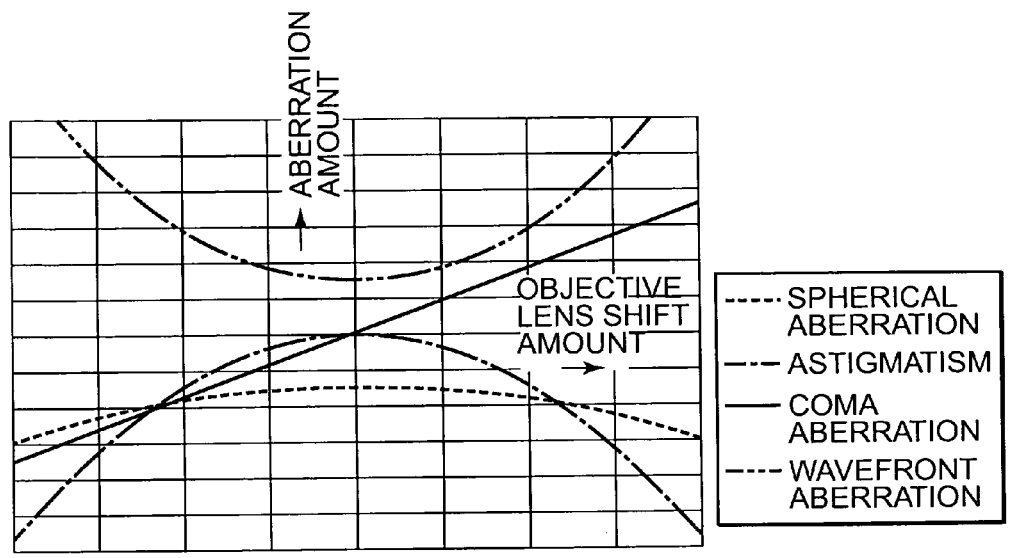
FIG. 17A and FIG. 17B are graphs showing still another example of the relations between the objective lens shift amount and the aberration amount in the objective lens and the coupling lens of the finite optical system to which the present invention is applied.
Figure 17B:
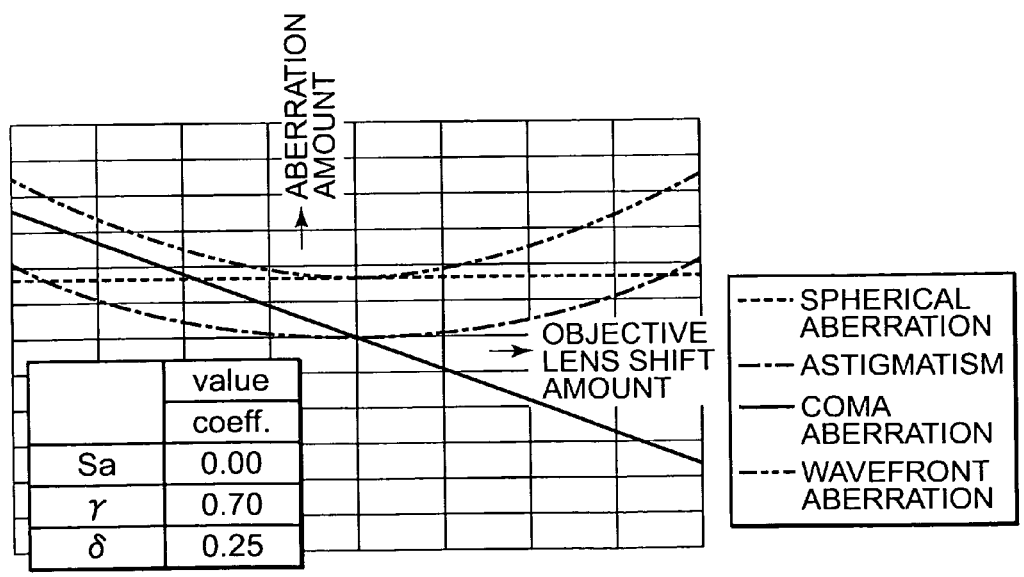

FIGS. 17A and 17B are graphs showing relations between the objective lens shift amount and the aberration amount in the finite optical system when not only the surface shape of the coupling lens but also the surface shape of the objective lens is optimized. In the FIGS. 17A and 17B, the vertical axis indicates an aberration amount, and the vertical axis indicates an objective lens shift amount. In FIG. 17A, a spherical aberration amount, astigmatism amount, coma aberration amount, and wavefront aberration amount according to the objective lens shift amount of the objective lens are shown, respectively, as a graph, and in FIG. 17B, a spherical aberration amount, astigmatism amount, coma aberration amount, and wavefront aberration amount according to the objective lens shift amount in the coupling lens are shown, respectively, as a graph.

In this case, as described above, since the surface shape of the objective lens is optimized to add the spherical aberration in advance, in FIG. 17A, an absolute value of the spherical aberration amount increases across the objective lens shift amount in comparison with the cases of FIGS. 11A, 13A, 15A.

The surface shape of the coupling lens having the characteristics shown in FIG. 17B has been optimized so as to give the appropriate aberration coefficient $S_a$ of Zernike fourth-order spherical aberration found by the above-described formulae (1) and (2). In this example, there is used a coupling lens whose surface shape is optimized so that the value of the aberration coefficient $S_a$ of Zernike fourth-order spherical aberration becomes 0.08 (coeff.), the value of $\gamma$, which is the ratio B/A of the light flux diameter B to the entire effective diameter A of the coupling lens, becomes 0.70 (coeff.) and the value of $\delta$, which is the ratio 2s/B of the light flux movement amount s at the time of objective lens shift to the light flux radius B/2, becomes 0.25 (coeff.).

Figure 18:
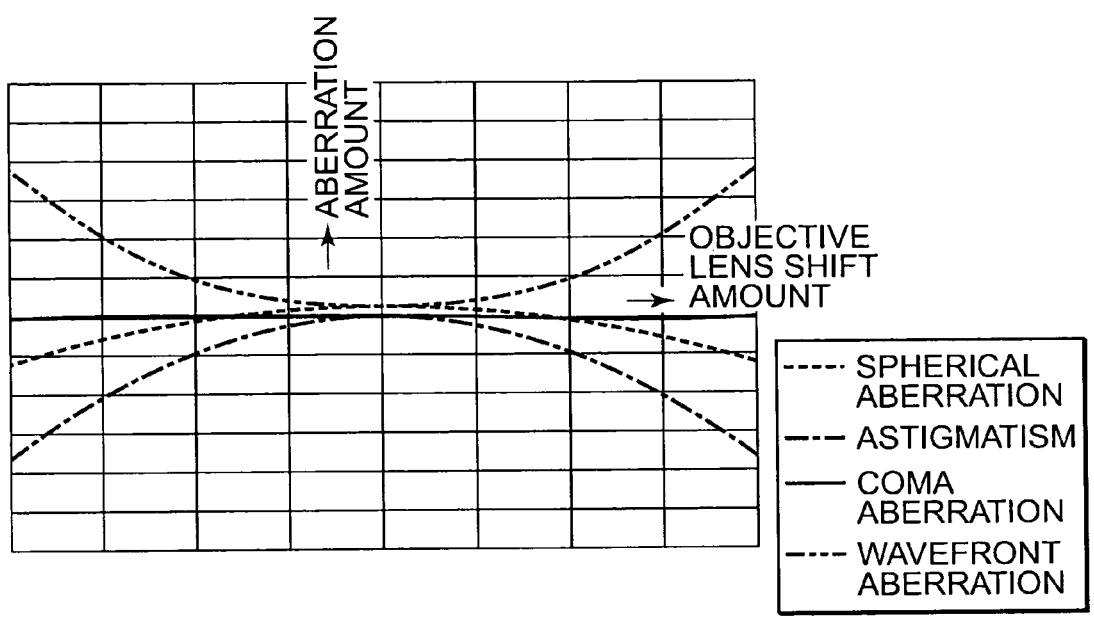
FIG. 18 is a graph showing a relation between the objective lens shift amount and the aberration amount in the entire finite optical system corresponding to FIG. 17.

In a case where the optical pickup apparatus employing the finite optical system made of the objective lens having the characteristics shown in FIG. 17A and the coupling lens having the characteristics shown in FIG. 17B is constructed, the characteristics of the optical pickup apparatus (entire optical system) are as shown in FIG. 18. In FIG. 18, also, with the vertical axis indicating an aberration amount, and the horizontal axis indicating an objective lens shift amount, a spherical aberration amount, astigmatism amount, coma aberration amount, and wavefront aberration amount according to the objective lens shift amount of the optical pickup apparatus are shown, respectively, as a graph.

As shown in the figure, since not only the surface shape of the coupling lens but also the surface shape of the objective lens is optimized to correct the spherical aberration caused by the coupling lens, in comparison with the case of FIG. 14, increases in the spherical aberration amount, in the astigmatism amount, in the coma aberration amount, and in the wavefront aberration amount according to the objective lens shift amount are further suppressed, so that the field-of-view characteristics of the optical pickup apparatus are further improved.

Next, results obtained by actually constructing the optical pickup apparatus employing the finite optical system and measuring the objective lens shift amount and the aberration amount are described.

Figure 19:
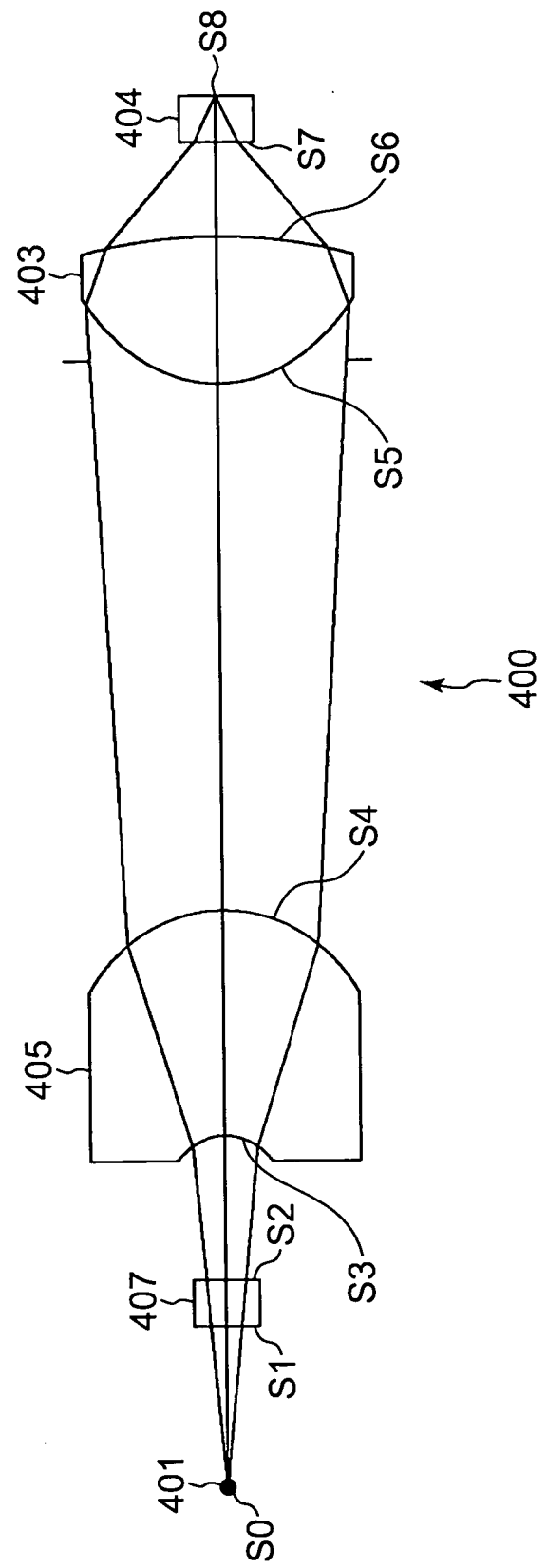
FIG. 19 is a diagram showing still another configuration example of the optical pickup unit of FIG. 3.

Here, the objective lens shift amount and the aberration amount measured by using an optical pickup apparatus 400 as shown in FIG. 19 are described. Since a light source 401 to a coupling lens 405 in FIG. 19 correspond to the light source 201 to the coupling lens 205 in FIG. 4, a detailed description is omitted. A light source lens 407 is provided to change light irradiated by the light source 401 into a predetermined light flux.

An exit surface of the light source 401 of this optical pickup apparatus 400 is S0, a surface on the light source 401 side and a surface on an optical recording medium 404, specifically, a left surface and a right surface in the figure, of the light source lens 407 are S1 and S2, respectively, and a surface on the light source 401 side and a surface on the optical recording medium 404 side of the coupling lens 405 are S3 and S4, respectively. Moreover, a surface on the light source 401 side and a surface on the optical recording medium 404 side of the objective lens 403 are S5 and S6, respectively, and a surface on the light source 401 side and a surface on the optical recording medium 404 side of the optical recording medium 404 are S7 and S8, respectively. At this time, a distance t to the next surface in each of the surfaces S0 to S8, which are surfaces of the respective optical systems of the optical pickup apparatus 400, and a refractive index n of a substance existing between the relevant surface and the next surface are set as shown in FIG. 20.

Measurement results in a case where the optical pickup apparatus 400 is constructed such that the astigmatism accompanying the objective lens shift is corrected by optimizing a surface shape of the coupling lens 405 so as to give the appropriate aberration coefficient $S_a$ of fourth-order spherical aberration and sixth-order spherical aberration $S_k$ found by formulae (3), (4) and (5) are explained. In this case, a wavelength of the light irradiated from the light source 401 is 660 nm, an NA of the objective lens 403 is 0.6, the value of the aberration coefficient $S_a$ of Zernike fourth-order spherical aberration of the coupling lens 405 is 0.048 (coeff.), and the value of the aberration coefficient $S_k$ of -Zernike sixth-order spherical aberration is 0.015 (coeff.). Moreover, surface shapes of the surfaces S3 and S4 of the coupling lens 405 and the surfaces S5 and S6 of the objective lens 403 are formed as shown in FIG. 21 to measure the objective lens shift amount and the aberration amount.

Parameters R, K, A, B, C, D shown in FIG. 21 indicate values of the parameters R, K, A, B, C, D in an aspheric surface aberration function expressed by formula (9). In other words, by setting the values of the parameters R, K, A, B, C, D of formula (9) as shown in FIG. 21, the surface shapes of the surfaces S3 and S4 of the coupling lens 405 and the surfaces S5 and S6 of the objective lens 403 are specified.

$$Z(\rho) = \frac{(1/R)\rho^2}{1 + \sqrt{1 - (1+K)(1/R)^2\rho^2}} + [A\rho^4 + B\rho^6 + C\rho^8 + D\rho^{10}] \quad (9)$$

$\rho$: a height from the optical axis

Figure 22A:
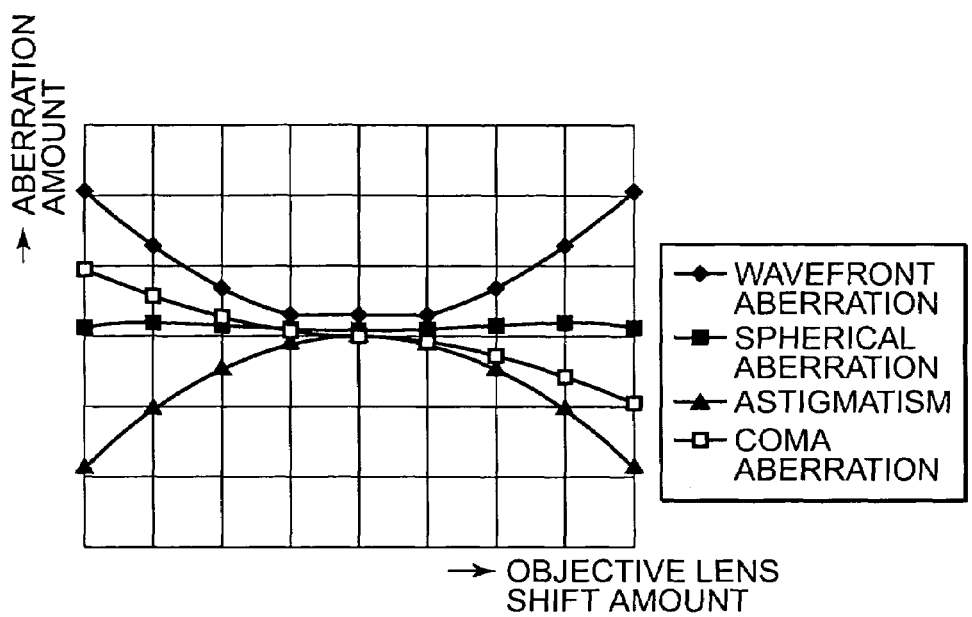
FIG. 22A and FIG. 22B are graphs showing measuring results of an objective lens shift amount and an aberration amount in the optical system of FIG. 19 using the coupling lens and the objective lens, corresponding to FIG. 21.
Figure 22B:
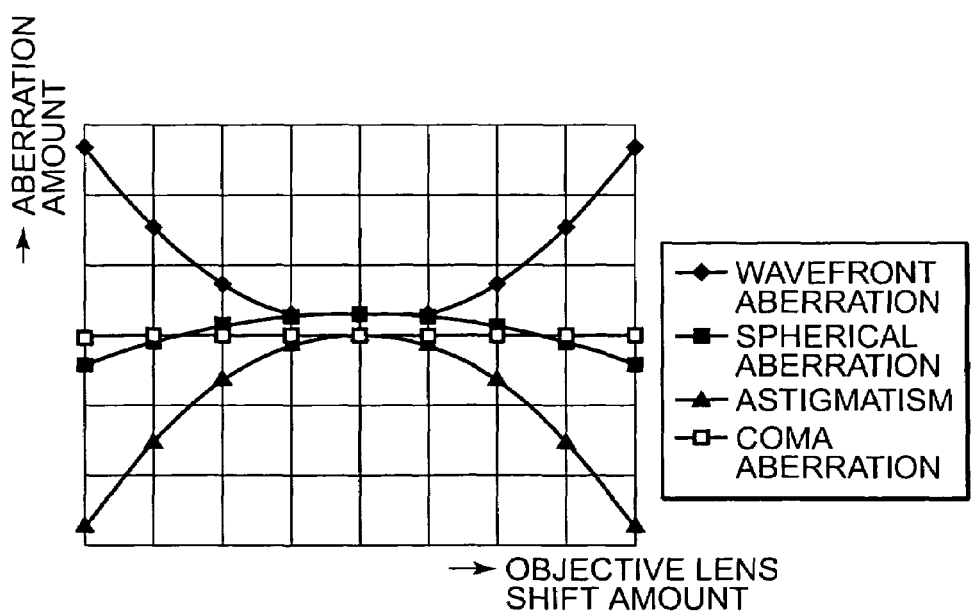

FIG. 22A is a graph showing the measurement results of the objective lens shift amount and the aberration amount (wavefront aberration amount, spherical aberration amount, astigmatism amount, and coma aberration amount) in the entire system of the optical pickup apparatus 400 in the case where the surface shapes of the coupling lens 405 and the objective lens 403 are formed as shown in FIG. 21. FIG. 22B is a graph showing measurement results of the objective lens shift amount and the aberration amount of the objective lens 403 alone in the same optical pickup apparatus 400.

As shown in FIG. 22A, in the optical pickup apparatus 400, an increase in the aberration amount along with an increase in the objective lens shift amount is suppressed in comparison with the case of the objective lens 403 alone (FIG. 22B).

Next, measurement results in the case where the optical pickup apparatus 400 is constructed such that the astigmatism according to the objective lens shift is corrected and the spherical aberration caused by the coupling lens 405 is corrected by optimizing the surface shape of the coupling lens 405 so as to give the appropriate aberration coefficient $S_a$ of Zernike fourth-order spherical aberration obtained by formulae (1) and (2), and optimizing the surface shape of the objective lens 403 so as to give the spherical aberration $W_{sa}$ satisfying formula (8) are explained. In this case, the wavelength of the light irradiated from the light source 401 is 660 nm, the NA of the objective lens 403 is 0.6, the value of the aberration coefficient $S_a$ of Zernike fourth-order spherical aberration of the coupling lens 405 is 0.045 (coeff.). Moreover, the surface shapes of the surfaces S3 and S4 of the coupling lens 405 and the surfaces S5 and S6 of the objective lens 403 are formed as shown in FIG. 23 to measure the objective lens shift amount and the aberration amount.

FIG. 23, similar to FIG. 21, specifies the values of the parameters R, K, A, B, C, D in the aspherical aberration function expressed by formula (9), and the surface shapes of the lenses are specified by formula (9).

Figures 24A, 24B:
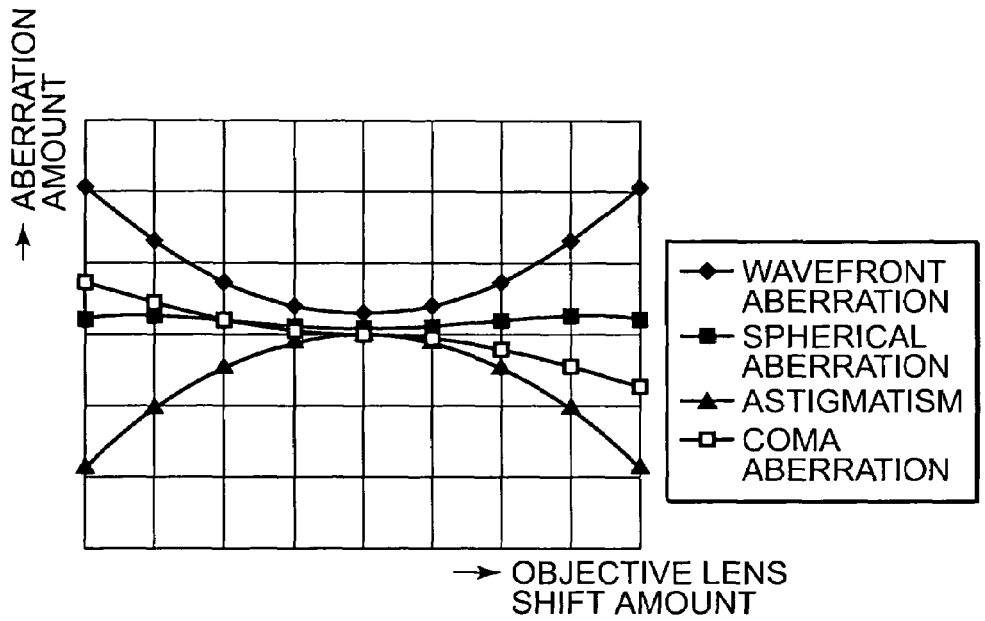
FIG. 24A and FIG. 24B are graphs showing measuring results of the objective lens shift amount and the aberration amount in the optical system of FIG. 19 using the coupling lens and the objective lens, corresponding to FIG. 23.

FIG. 24A is a graph showing the measurement results of the objective lens shift amount and the aberration amount (wavefront aberration amount, spherical aberration amount, astigmatism amount, and coma aberration amount) in the entire system of the optical pickup apparatus 400 in the case where the surface shapes of the coupling lens 405 and the objective lens 403 are formed as shown in FIG. 23. FIG. 24B is a graph showing measurement results of the objective lens shift amount and the aberration amount of the objective lens 403 alone in the same optical pickup apparatus 400.

As shown in FIG. 24a, in the optical pickup apparatus 400, an increase in the aberration amount along with an increase in the objective lens shift amount is suppressed in comparison with the case of the objective lens 403 alone (FIG. 24b).

According to the embodiments of the present invention, stable aberration correction can be performed with a small-sized apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup apparatus which includes a light source that generates light irradiating an optical recording medium, and an objective lens that collects the light irradiated from the light source on a recording surface of the recording medium, the optical pickup apparatus comprising:
   a coupling lens arranged on an optical path between the light source and the objective lens, wherein:
   a surface shape of the coupling lens is formed so that a preset spherical aberration amount is generated in the light irradiated from the light source at a position settled corresponding to a shift amount of the objective lens and where the light irradiated from the light source passes through the coupling lens, when the objective lens shifts, and wherein a preset fourth-order or sixth-order spherical aberration amount is added to the light passing through the coupling lens.

2. The optical pickup apparatus according to claim 1, wherein the coupling lens has a surface shape which adds spherical aberration to the light passing through the coupling lens, the spherical aberration satisfying the formula:

$$|W_{as} - 12S_a\gamma^4\delta^2| < |W_{as}| \quad (21),$$

where, in an entire effective diameter region of the coupling lens, an aberration coefficient of Zernike fourth-order spherical aberration is $S_a$, a ratio B/A of a light flux diameter B to an entire effective diameter A of the coupling lens is $\gamma$, a ratio 2s/B of a light flux movement amount s at the time of objective lens shift to a light flux radius B/2 is $\delta$, and a Zernike astigmatism coefficient of off-axis astigmatism caused in the objective lens is $W_{as}$.

3. The optical pickup apparatus according to claim 2, wherein the objective lens has a surface shape which adds off-axis coma aberration to the light passing through the objective lens, the off-axis coma aberration satisfying the formula:

$$|W_{coma} - [-8S_a\gamma^4\delta]| < |-8S_a\gamma^4\delta| \quad (24),$$

where a Zernike coma aberration coefficient of field-of-view coma aberration of the light passing through the objective lens is $W_{coma}$, and in an entire effective diameter region of the coupling lens, an aberration coefficient of Zernike fourth-order spherical aberration is $S_a$, a ratio B/A of a light flux diameter B to an entire effective diameter A of the coupling lens is $\gamma$, and a ratio 2s/B of a light flux movement amount s at the time of objective lens shift to a light flux radius B/2 is $\delta$.

4. The optical pickup apparatus according to claim 1, wherein the coupling lens has a surface shape which adds spherical aberration to the light passing through the coupling lens, the spherical aberration satisfying the formulae:

$$|W_{as} - [12S_a\gamma^4\delta^2 + S_k(210\gamma^6\delta^2 - 60\gamma^4\delta^2)]| < |W_{as}| \quad (22)$$

and $$|-8S_a\gamma^4\delta + S_k(-120\gamma^6\delta^3 - 24\gamma^6\delta + 40\gamma^4\delta)| < |-8S_a\gamma^4\delta| \quad (23),$$

where, in an entire effective diameter region of the coupling lens, an aberration coefficient of Zernike fourth-order spherical aberration is $S_a$, an aberration coefficient of Zernike sixth-order spherical aberration is $S_k$, a ratio B/A of a light flux diameter B to an entire effective diameter A of the coupling lens is $\gamma$, a ratio 2s/B of a light flux movement amount s at the time of objective lens shift to a light flux radius B/2 is $\delta$, and a Zernike astigmatism coefficient of field-of-view astigmatism caused in the objective lens is $W_{as}$.

5. The optical pickup apparatus according to claim 4, wherein the objective lens has a surface shape which adds spherical aberration to the light passing through the objective lens, the spherical aberration satisfying the formulae:

$$|W_{sa} - S| < |S| \quad (25)$$

$$S = S_a\gamma^4 + S_k(-30\gamma^6\delta^2 + 5\gamma^6 - 5\gamma^4) \quad (26),$$

where a Zernike spherical aberration coefficient of the spherical aberration of the objective lens is $W_{sa}$, and in an entire effective diameter region of the coupling lens, an aberration coefficient of Zernike fourth-order spherical aberration is $S_a$, an aberration coefficient of Zernike sixth-order spherical aberration is $S_k$, a ratio B/A of a light flux diameter B to an entire effective diameter A of the coupling lens is $\gamma$, and a ratio 2s/B of a light flux movement amount s at the time of objective lens shift to a light flux radius B/2 is $\delta$.

6. An optical pickup apparatus which includes a light source that generates light irradiating an optical recording medium, an objective lens that collects the light irradiated from the light source on a recording surface of the recording medium, and a coupling lens arranged on an optical path between the light source and the objective lens, the optical pickup apparatus comprising:

an optical element arranged on the optical path between the coupling lens and the objective lens, wherein:

a surface shape of the optical element is formed so that a preset spherical aberration amount is generated in the light irradiated from the light source at a position settled corresponding to a shift amount of the objective lens and where the light irradiated from the light source passes through the optical element when the objective lens shifts.

7. The optical pickup apparatus according to claim 6, wherein a preset fourth-order or sixth-order spherical aberration amount is added to the light passing through the optical element.

8. The optical pickup apparatus according to claim 7, wherein the optical element is constructed integrally with another optical element arranged in an optical disc apparatus in advance for correcting the spherical aberration caused by fluctuations in thickness of an optical disc or fluctuations in environmental temperature.

9. The optical pickup apparatus according to claim 7, wherein the optical element is made of a liquid crystal element.

10. The optical pickup apparatus according to claim 7, wherein the optical element has a surface shape which adds spherical aberration to the light passing through the optical element, the spherical aberration satisfying the formula:

$$|W_{as} - 12S_a\gamma^4\delta^2| < |W_{as}| \quad (21),$$

where, in an entire effective diameter region of the optical element, as aberration coefficient of Zernike fourth-order spherical aberration is $S_a$, a ratio B/A of a light flux diameter B to an entire effective diameter A of the coupling lens is $\gamma$, a ratio 2s/B of a light flux movement amount s at the time of objective lens shift to a light flux radius B/2 is $\delta$, and a Zernike astigmatism coefficient of off-axis astigmatism caused in the objective lens is $W_{as}$.

11. The optical pickup apparatus according to claim 10, wherein the objective lens has a surface shape which adds off-axis coma aberration to the light passing through the objective lens, the off-axis coma aberration satisfying the formula:

$$|W_{coma} - [-8S_a\gamma^4\delta]| < |-8S_a\gamma^4\delta| \quad (24),$$

where a Zernike coma aberration coefficient of field-of-view coma aberration of the light passing through the objective lens is $W_{coma}$, and in an entire effective diameter region of the optical element, n aberration coefficient of Zernike fourth-order spherical aberration is $S_a$, a ratio B/A of a light flux diameter B to an entire effective diameter A of the optical element is $\gamma$, and a ratio 2s/B of a light flux movement amount s at the time of objective lens shift to a light flux radius B/2 is $\delta$.

12. The optical pickup apparatus according to claim 7, wherein the optical element has a surface shape which adds spherical aberration to the light passing through the optical element, the spherical aberration satisfying the formulae:

$$|W_{as} - [12S_a\gamma^4\delta^2 + S_k(210\gamma^6\delta^2 - 60\gamma^4\delta^2)]| < |W_{as}| \quad (22)$$

and $$|-8S_a\gamma^4\delta + S_k(-120\gamma^6\delta^3 - 24\gamma^6\delta + 40\gamma^4\delta)| < |-8S_a\gamma^4\delta| \quad (23),$$

where, in an entire effective diameter region of the optical element, an aberration coefficient of Zernike fourth-order spherical aberration is $S_a$, an aberration coefficient of Zernike sixth-order spherical aberration is $S_k$, a ratio B/A of a light flux diameter B to an entire effective diameter A of the coupling lens is $\gamma$, a ratio 2s/B of a light flux movement amount s at the time of objective lens shift to a light flux radius B/2 is $\delta$, and a Zernike astigmatism coefficient of field-of-view astigmatism caused in the objective lens is $W_{as}$.

13. The optical pickup apparatus according to claim 10, wherein the optical element has a surface shape which adds spherical aberration to the light passing through the objective lens, the spherical aberration satisfying the formulae:

$$|W_{sa} - S| < |S| \quad (25)$$

$$S = S_a\gamma^4 + S_k(-30\gamma^6\delta^2 + 5\gamma^6 - 5\gamma^4) \quad (26),$$

where a Zernike spherical aberration coefficient of the spherical aberration of the objective lens is $W_{sa}$, and in an entire effective diameter region of the coupling lens, an aberration coefficient of Zernike fourth-order spherical aberration is $S_a$, an aberration coefficient of Zernike sixth-order spherical aberration is $S_k$, a ratio B/A of a light flux diameter B to an entire effective diameter A of the coupling lens is γ, and a ratio 2s/B of a light flux movement amount s at the time of objective lens shift to a light flux radius B/2 is δ.

14. An optical disc apparatus having an optical pickup unit which includes a light source that generates light irradiating an optical recording medium, and an objective lens that collects the light irradiated from the light source on a recording surface of the recording medium, the optical disc apparatus comprising:

a coupling lens arranged on an optical path between the light source and the objective, wherein:

a surface shape of the coupling lens is formed so that a preset spherical aberration amount is generated in the light irradiated from the light source at a position settled corresponding to a shift amount of the objective lens and where the light irradiated from the light source passes through the coupling lens, when the objective lens shifts, and wherein a preset fourth-order or sixth-order spherical aberration amount is added to the light passing through the coupling lens.

15. An optical disc apparatus having an optical pickup unit which includes a light source that generates light irradiating an optical recording medium, an objective lens that collects the light irradiated from the light source on a recording surface of the recording medium, and a coupling lens arranged on an optical path between the light source and the objective lens, the optical disc apparatus comprising:

an optical element arranged on the optical path between the coupling lens and the objective lens, wherein:

a surface shape of the optical element is formed so that a preset spherical aberration amount is generated in the light irradiated from the light source at a position settled corresponding to a shift amount of the objective lens and where the light irradiated from the light source passes through the optical element when the objective lens shifts.

* * * * *